United States Patent [19]

Hioki et al.

[11] Patent Number: 4,900,648

[45] Date of Patent: Feb. 13, 1990

[54] OPTICAL INFORMATION RECORDING MEDIUM

[75] Inventors: Takanori Hioki; Yoshio Inagaki, both of Minami-Ashigara; Masao Yabe, Fujinomiya, all of Japan

[73] Assignee: Fuji Photo Film Co., Ltd., Kanagawa, Japan

[21] Appl. No.: 161,475

[22] Filed: Feb. 26, 1988

[30] Foreign Application Priority Data

Feb. 27, 1987 [JP] Japan ................... 62-44869

[51] Int. Cl.[4] .................. G03C 1/72; G03C 5/16; G11B 7/24; B41M 5/26
[52] U.S. Cl. .................... 430/270; 430/495; 430/945; 346/135.1
[58] Field of Search ............... 430/270, 495, 945, 75, 430/76, 77, 78; 346/135.1

[56] References Cited

U.S. PATENT DOCUMENTS

| | | | |
|---|---|---|---|
| 4,548,886 | 10/1985 | Katagiri et al. | 430/70 |
| 4,629,670 | 12/1986 | Katagiri et al. | 430/58 |
| 4,730,902 | 3/1988 | Suzuki et al. | |
| 4,738,908 | 4/1988 | Oguchi et al. | 430/20 |
| 4,761,181 | 8/1988 | Suzuki | |
| 4,763,966 | 8/1988 | Suzuki et al. | |
| 4,767,571 | 8/1988 | Suzuki et al. | |
| 4,791,023 | 12/1988 | Suzuki et al. | |
| 4,851,322 | 7/1989 | Inagaki et al. | |

*Primary Examiner*—Paul R. Michl
*Assistant Examiner*—Mark R. Buscher
*Attorney, Agent, or Firm*—Birch, Stewart, Kolasch & Birch

[57] ABSTRACT

The present invention relates to an optical information recording medium for carrying out recording, reproduction and erasing with laser beams which comprises a support having carried thereon at least one methine dye which consists of an azulene nucleus, at least one of 10 carbon atoms of which is replaced by chalcogen atom(s) and/or nitrogen atom(s), and further whose 7-membered ring part is substituted with a methine bond having at the terminal an auxochrome which forms a conjugated resonance chromophore together with a 10 $\pi$ electron system of the nucleus.

Optical information recording media of the invention have adequate recording characteristics having high C/N, and have high stabilities against long-term preservation or against long-time reading.

20 Claims, No Drawings

OPTICAL INFORMATION RECORDING MEDIUM

BACKGROUND OF THE INVENTION

1. Field of the Invention

The present invention relates to optical information recording media each having a recording layer containing a novel dye. Particularly, the invention relates to optical information recording media wherein recording and reproduction are carried out using laser beams.

2. Description of the Prior Art

Heretofore, information recording media wherein recording and reproduction of information are each carried out by irradiating a rotating disc-shaped information recording medium with a laser beam have been known. As recording layers in these information media, those wherein metals having low melting points, or metals having low melting points and dielectric substances are used are proposed. However, these recording layers have disadvantages such as poor preservability, low resolution, low recording density and high manufacturing cost. Recently, it has been proposed and practised that dye films whose physical properties may be changed with light of relatively long wavelength are used in recording layers. However, dyes which have absorption bands in long wavelength generally have problems. For example, one problem is that they have only low stabilities against heat and light. Thus, it is currently the cases that recording layers having recording characteristics which are stable over a long period of time and satisfactory have not yet been developed.

SUMMARY OF THE INVENTION

Thus, the object of the present invention is to provide optical information recording media each having a dye recording layer which is capable of maintaining adequate recording characteristics over a long period of time and thus is excellent in stability.

The object of the invention has been attained by an optical information recording medium which comprises a support having carried thereon methine dye(s) which each consist(s) of an azulene nucleus, at least one of 10 carbon atoms of which, preferably at least one of carbon atoms at the 1- and 3-positions of which is replaced by chalcogen atom(s) (for example, oxygen atom(s), sulfur atom(s), selenium atom(s), tellurium atom(s) or the like) or nitrogen atom(s) (hereinafter referred to as a heteroazulene nuleus), and further whose 7-membered ring part is substituted with a methine bond having at the terminal an auxochrome which forms a conjugated resonance chromophore together with 10 $\pi$ electron system of the nucleus.

DETAILED DESCRIPTION OF THE INVENTION

Such a methine dye exhibits stability of a level higher than that expected based on the number of methine groups in the chromophore, and exhibits an absorption peak in a relatively long wavelength. These advantages are attributable to the existance of a heteroazulene nucleus in the dye.

Methine dyes used in the present invention each consist of a heteroazulene nucleus which is substituted with a methine bond having an auxochrome at the terminal. The 10 $\pi$ electron system and auxochrome of the heteroazulene nucleus are bound together through carbon atoms lying between them. As is seen from the bond through carbon atoms between the heteroazulene nucleus and the auxochrome, the pattern of an alternative single bond and a double bond exists and each dye may be represented by two different formulae. These two formulae represent the limit of different resonance states, and in these two formulae positions of the single bond and the double bond binding carbon atoms are exchanged. That is, the heteroazulene nucleus and the auxochrome form a conjugated resonance chromophore through the bond.

Generic characteristics of dyes used in the present invention may be understood by taking the synthesis of them into consideration. The heteroazulene nucleus used as a starting substance for synthesis of a dye of the present invention has a positive charge, which activates at least one of the nucleus carbon atoms of the heteroazulene nucleus or a methyl substituent thereof as a reactive site. This activated nucleus carbon atom of the heteroazulene nucleus can be regarded as a carbocation in one resonance form. When the instant carbon atom is methyl-substituted, a carbanion is formed by deprotonization of the methyl substituent in one resonance form. A methine bond is formed from a carbocation (positive) or carbanion (negative) site of the heteroazulene nucleus.

Although there are many embodiments consistent with the above general explanation, the present invention will be explained by citing typical embodiments.

In a methine dye containing a heteroazulene nucleus as used in the present invention, the preferred heteroazulene nucleus is an azulene nucleus, at least one of carbon atoms at the 1-and 3-positions of which is replaced by chalcogen atom(s) or nitrogen atom(s). Therefore, such a nucleus is explained below as a representative example.

Dyes of the present invention may be represented as alternative resonance forms as shown in the following general formula (I):

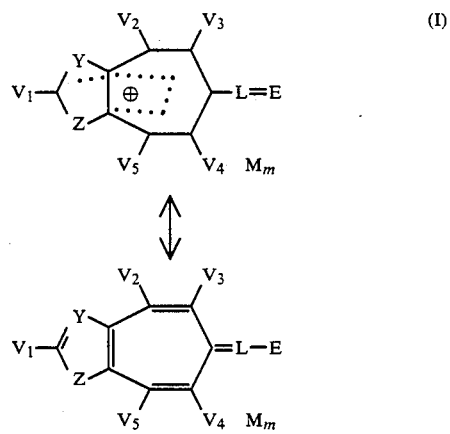

wherein E represents an auxochrome; L represents a methine bond; $V_1$, $V_2$, $V_3$, $V_4$ and $V_5$ each represent hydrogen atoms, halogen atoms, substituted or unsubstituted alkyl groups, acyl groups, acyloxy groups, substituted or unsubstituted alkoxycarbonyl groups, substituted or unsubstituted carbamoyl groups, substituted or unsubstituted sulfamoyl groups, carboxyl groups, cyano groups, hydroxyl groups, amino groups, acylamino groups, substituted or unsubstituted alkoxy groups, alkylthio groups, alkylsulfonyl groups, sulfonic acid groups, or aryl groups, or alternatively two of $V_1$ to $V_5$ linking to adjacent carbon atoms may combine to form a condensed ring.

Y and Z each represent carbon atoms

wherein V has the same meaning with $V_1$, $V_2$, $V_3$, $V_4$ and $V_5$), chalcogen atoms (for example, oxygen atoms, sulfur atoms, selenium atoms, tellurium atoms or the like) or nitrogen atoms

wherein $R_1$ is in some occasion necessary for forming a nucleus and in the other occasion unnecessary, and when needed, represents a hydrogen atom, a substituted or unsubstituted alkyl group, a substituted or unsubstituted aryl group or a heterocyclic ring group), provided that Y and Z do not represent carbon atoms at the same time. Further, when Y and Z are represented by chalcogen atoms or nitrogen atoms, at least one of them is a nitrogen atom. Further, when one of Y and Z represents a chalcogen atom, and the other represents a carbon atom or a nitrogen atom, Z represents a chalcogen atom and Y represents a carbon atom or a nitrogen atom.

M represents a counter ion for charge balance, m is the number of 0 or more necessary for balance of charge.

Bonding position of a methine bond L was representatively expressed as the 6-position in the formula (I), but may also be expressed as another position (4-, 5-, 7- or 8-position). However, preferred bonding positions of L are the 4-, 6- and 8-positions, particularly 4-and 6-positions.

The auxochrome E is explained in more detail below.

E may take an arbitrary general form found in methine dyes. Typically, the auxochrome is composed of nitrogen or chalcogen atoms, and resonates between a charged state and an uncharged state in the dye. E may take any form of auxochromes found, for example in cyanine, merocyanine, oxonol, pyrylium or thiapyrylium dyes. However, it is not necessary to restrict the auxochrome to such species. Though not so general, auxochromes composed of other atoms such as phosphorus or boron atoms may be mentioned. For example, 2-triphenylphosphoro-1,3-cyclopentadiene-5-yl may be mentioned.

Preferred dyes among those represented by the general formula (I) are those represented by the following general formulae (II) to (IX).

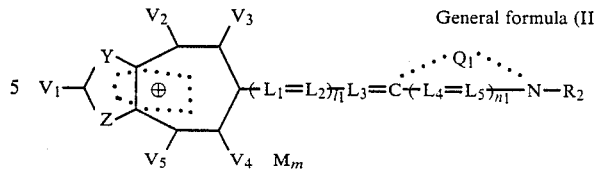

General formula (II)

wherein $V_1$ to $V_5$, Y, Z, M and m have the same meanings as those in the general formula (I); the position of the methine bond may be any of the 4-, 5-, 6-, 7- and 8-positions, as is in the general formula (I);

$Q_1$ represents an atomic group necessary for forming a 5- or 6-membered nitrogen-containing ring; $L_1$, $L_2$, $L_3$, $L_4$ and $L_5$ each represent methine groups which may optionally be substituted;

$R_2$ represents a substituted or unsubstituted alkyl group; $l$ represents an integer of 0 to 3; and $n_1$ represents 0 or 1.

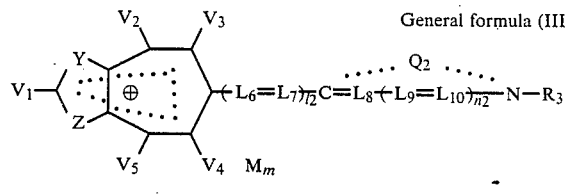

General formula (III)

wherein $V_1$ to $V_5$, Y, Z, M and m have the same meanings as those in the general formula (I); the position of the methine bond may be any of the 4-, 5-, 6-, 7- and 8-positions, as is in the general formula (I);

$Q_2$ represents an atomic group necessary for forming a 5- or 6-membered nitrogen-containing ring; $L_6$, $L_7$, $L_8$, $L_9$ and $L_{10}$ have the same meanings with $L_1$, $L_2$, $L_3$, $L_4$ and $L_5$;

$R_3$ represents a substituted or unsubstituted alkyl group;

$l_2$ represents an integer of 0 to 3; and $n_2$ represents 0 or 1.

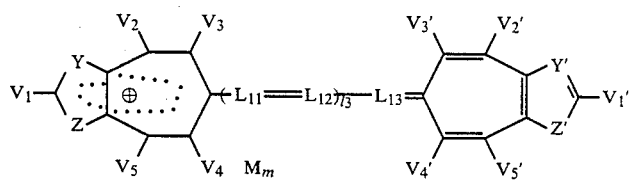

wherein $V_1$ to $V_5$, Y, Z, M and m have the same meanings as those in the general formula (I); Y' and Z' have the same meanings as Y and Z, respectively; the position of the methine bond may be any of the 4-, 5-, 6-, 7- and 8-positions;

$V_1'$ to $V_5'$ have the same meanings as $V_1$ to $V_5$, respectively; $L_{11}$, $L_{12}$ and $L_{13}$ have the same meanings as $L_1$, $L_2$, $L_3$, $L_4$ and $L_5$; and $l_3$ represents an integer of 0 to 3.

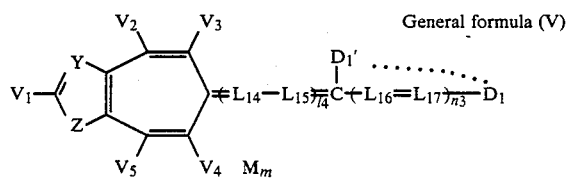
General formula (V)

wherein $V_1$ to $V_5$, Y, Z, M and m have the same meanings as those in the general formula (I); the position of the methine bond may be any of the 4-, 5-, 6-, 7- and 8-positions, as is in the general formula (I);

$D_1$ and $D_1'$ each represent atomic groups necessary for forming an acidic nucleus, and may be a cyclic or cyclic;

$L_{14}$, $L_{15}$, $L_{16}$ and $L_{17}$ have the same meanings with $L_1$, $L_2$, $L_3$, $L_4$ and $L_5$; $l_4$ represents an integer of 0 to 3; and $n_3$ represents 0 or 1.

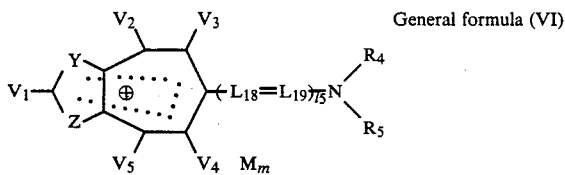
General formula (VI)

wherein $V_1$ to $V_5$, Y, Z, M and m have the same meanings as those in the general formula (I); the position of the methine bond may be any of the 4-, 5-, 6-, 7- and 8-positions, as is in the general formula (I);

$R_4$ and $R_5$ represent substituents known in general tertiary amines, and $R_4$ and $R_5$ may combine to form a ring;

$L_{18}$ and $L_{19}$ have the same meanings as $L_1$, $L_2$, $L_3$, $L_4$ and $L_5$; and l represents an integer of 0 to 3.

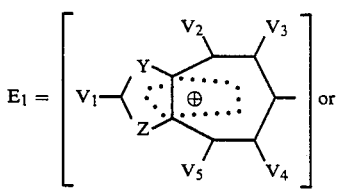
General formula (VII)

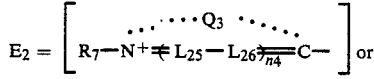

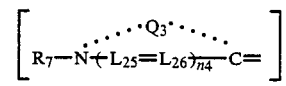

wherein

E and E' each is $E_1$ or $E_2$, provided that at least one of E and E' is $E_1$;

$V_1$ to $V_5$, Y, Z, M and m have the same meanings as those in the general formula (I); the position of the methine bond in $E_1$ may be any of the 4-, 5-, 6-, 7- and 8-positions, as is in the general formula (I);

$W_1$ represents an atomic group necessary for forming a 5- or 6-membered heterocyclic ring;

$R_6$ represents a hydrogen atom, a substituted or unsubstituted alkyl group, a substituted or unsubstituted aryl group or a heterocyclic group;

$Q_3$ and $R_7$ have the same meanings as $Q_1$ and $R_2$ in the general formula (II), respectively;

$L_{20}$, $L_{21}$, $L_{22}$, $L_{23}$, $L_{24}$, $L_{25}$ and $L_{26}$ have the same meanings with $L_1$, $L_2$, $L_3$, $L_4$ and $L_5$;

$l_6$ and $l_7$ are integers of 0 to 3; and $n_4$ is 0 or 1.

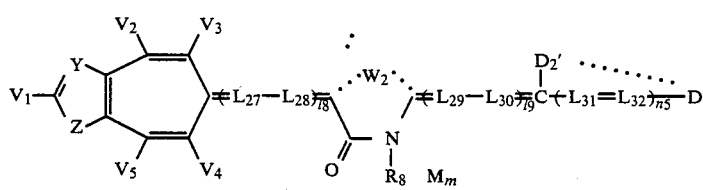
General formula (VIII)

wherein $V_1$ to $V_5$, Y, Z, M and m have the same meanings as those in the general formula (I); the position of the methine bond may be any of the 4-, 5-, 6-, 7- and 8-positions, as is in the general formula (I);

$W_2$ has the same meaning as $W_1$; $R_8$ has the same meaning as $R_6$;

$D_2$ and $D_2'$ have the same meanings as $D_1$ and $D_1'$ in the general formula (V), respectively;

$L_{27}$, $L_{28}$, $L_{29}$, $L_{30}$, $L_{31}$ and $L_{32}$ have the same meanings as $L_1$, $L_2$, $L_3$, $L_4$ and $L_5$;

$l_8$ and $l_9$ are integers of 0 to 3; and $n_5$ represents 0 or 1.

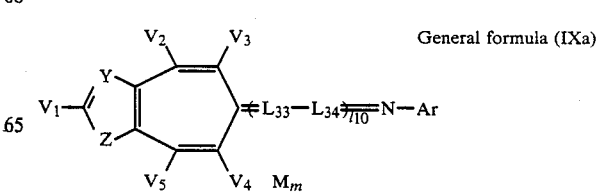
General formula (IXa)

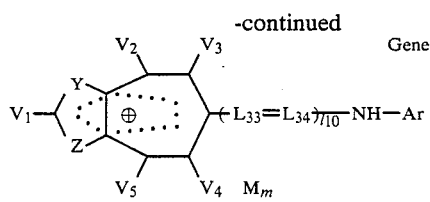

General formula (IXb)

wherein $V_1$ to $V_5$, Y, Z, M and m have the same meanings as those in the general formula (I), the position of the methine bond may be any of the 4-, 5-, 6- and 8-positions, as is in the general formula (I);

$L_{33}$ and $L_{34}$ have the same meanings as $L_1$, $L_2$, $L_3$, $L_4$ and $L_5$;

Ar represents an aromatic group; and $l_{10}$ represents an integer of 0 to 3.

The general formulae (I) to (IX) are described below in detail.

Preferred examples of $R_1$ include a hydrogen atom; an unsubstituted alkyl group having 18 or less carbon atoms (for example, a methyl, ethyl, propyl, butyl, pentyl, octyl, decyl, dodecyl or octadecyl group or the like); a substituted alkyl group {an alkyl group having 18 or less carbon atoms substituted with a carboxyl group, a sulfo group, a cyano group, halogen atom(s) (for example, fluorine, chlorine or bromine atoms or the like), a hydroxyl group, an alkoxycarbonyl group having 8 or less carbon atoms (for example, a methoxycarbonyl, ethoxycarbonyl, phenoxycarbonyl or benzyloxycarbonyl group or the like), an alkoxy group having 8 or less carbon atoms (for example, a methoxy, ethoxy, benzyloxy or phenethyloxy group or the like), a monocyclic aryloxy group having 10 or less carbon atoms (for example, a phenoxy or p-tolyloxy group or the like), an acyloxy group having 3 or less carbon atoms (for example, an acetyloxy or propionyloxy group or the like), an acyl group having 8 or less carbon atoms (for example, an acetyl, propionyl, benzoyl or mesyl group or the like), a substituted or unsubstituted carbamoyl group (for example, a carbamoyl, N,N-dimethylcarbamoyl, morpholinocarbonyl or piperidinocarbonyl group), a substituted or unsubstituted sulfamoyl group (for example, a sulfamoyl, N,N-dimethylsulfamoyl, morpholinosulfonyl or piperidinosulfonyl group), a substituted or unsubstituted aryl group having 10 or less carbon atoms (for example, a phenyl, 4-chlorophenyl, 4-methylphenyl or α-naphthyl group or the like), or the like}; an aryl group (for example, a phenyl or 2-naphthyl group or the like); a substituted aryl group (for example, a 4-carboxyphenyl, 4-sulfophenyl, 3-chlorophenyl or 3-methylphenyl group or the like); and a heterocyclic group (for example, a 2-pyridyl or 2-thiazolyl group or the like).

More preferably, $R_1$ is an unsubstituted alkyl group (for example, a methyl or ethyl group or the like) or a sulfoalkyl group (for example, a 2-sulfoethyl, 3-sulfopropyl or 4-sulfobutyl group or the like). Most preferably, $R_1$ is a methyl group.

A metal atom capable of forming a salt with $R_1$ is preferably an alkali metal, and an organic compound capable of forming a salt with $R_1$ is preferably a pyridine or an amine.

$V_1$, $V_2$, $V_3$, $V_4$, $V_5$, $V_1'$, $V_2'$, $V_3'$, $V_4'$ and $V_5'$ each are preferably hydrogen atoms, halogen atoms (for example, chlorine atoms, fluorine atoms, or bromine atoms), unsubstituted alkyl groups having 10 or less carbon atoms (for example, methyl or ethyl groups or the like), substituted alkyl groups having 18 or less carbon atoms (for example, benzyl, α-naphthylmethyl, 2-phenylethyl or trifluoromethyl groups), acyl groups having 10 or less carbon atoms (for example, acetyl, benzoyl or mesyl groups or the like), acyloxy groups having 10 or less carbon atoms (for example, acetyloxy groups or the like), substituted or unsubstituted alkoxycarbonyl groups (for example, methoxycarbonyl, ethoxycarbonyl or benzyloxycarbonyl groups or the like), substituted or unsubstituted carbamoyl groups (for example, carbamoyl, N,N-dimethylcarbamoyl, morpholinocarbonyl or piperidinocarbonyl groups or the like), substituted or unsubstituted sulfamoyl groups (for example, sulfamoyl, N,N-dimethylsulfamoyl, morpholinosulfonyl or piperidinosulfonyl groups or the like), carboxyl groups, cyano groups, hydroxyl groups, amino groups, acylamino groups having 8 or less carbon atoms (for example, acetylamino groups), substituted or unsubstituted alkoxy groups having 10 or less carbon atoms (for example, methoxy, ethoxy or benzyloxy groups or the like), alkylthio groups (for example, ethyl groups or the like), alkylsulfonyl groups (for example, methylsulfonyl groups or the like), sulfonic acid groups, or aryl groups (for example, phenyl or tolyl groups). Two of $V_1$ to $V_5$ which link to adjacent carbon atoms may combine to form a benzene ring or a heterocyclic ring (for example, a pyrrole ring, a thiophene ring, a furan ring, a pyridine ring, an imidazole ring, a triazole ring, a thiazole ring or the like).

Preferred $V_2$, $V_3$, $V_4$, $V_5$, $V_2'$, $V_3'$, $V_4'$ and $V_5'$ each are hydrogen atoms. Preferred $V_1$ and $V_1'$ each are hydrogen atoms, chlorine atoms, alkoxy groups (for example, methoxy groups or the like), alkylthio groups (for example, methylthio groups or the like) or aryl groups (for example, phenyl groups or the like).

When necessary for neutralizing the ion charge of the dye, Mm is contained in the formula for exhibiting the presence or the absence of cation(s) or anion(s). It depends on the auxochrome and the substituent whether a dye is a cation or an anion or whether the dye has ion charge. The counter ion may readily be exchanged after the preparation of the dye. Typical cations are an ammonium ion and alkali metal ions. The anion may specifically be an inorganic ion or an organic ion, and examples thereof include halide anions (for example, fluoride, chloride and iodide and the like), substituted arylsulfonate ions (for example, p-toluenesulfonate and p-chlorobenzenesulfonate ions and the like), aryldisulfonate ions (for example, 1,3-benzendisulfonate, 1,5-naphthalenedisulfonate and 2,6-naphthalenedisulfonate ions and the like), alkylsulfate ions (for example, a methylsulfate ion and the like), a sulfate ion, a thiocyanate ion, a perchlorate ion, a tetrafluoroborate ion, a picrate ion, an acetate ion, a trifluoromethanesulfonate ion, and the like. An iodide ion is preferred.

Examples of a nucleus formed containing $Q_1$ or $Q_2$ include a thiazole nucleus (for example, thiazole, 4-methylthiazole, 4-phenylthiazole, 4,5-dimethylthiazole, 4,5-diphenylthiazole or the like), a benzothiazole nucleus (for example, benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethoxybenzothiazole, 5-hydroxy-6-methylbenzothiazole, tetrahydrobenzothiazole, 4-phenylbenzothiazole or the like), a naphthothiazole nucleus (for example, naphtho(2,1-d)thiazole, naphtho(1,2-d)thiazole, naphtho(2,3-d)thiazole, 5-methoxynaphtho(1,2-d)thiazole, 7-ethoxynaphtho(2,1-d)thiazole, 8-methoxynaphtho(2,1-d)thiazole, 5-methoxynaphtho(2,3-d)thiazole or the like), a thiazoline nucleus (for example, thiazoline, 4-methylthiazoline, 4-nitrothiazoline or the like), an oxazole nucleus {an oxazole nucleus (for example, oxazole, 4-methyloxazole, 4-nitrooxazole, 5-methyloxazole, 4-phenyloxazole, 4,5-diphenyloxazole, 4-ethyloxazole or the like), a benzoxazole nucleus (for example, benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole or the like), a naphthoxazole nucleus (for example, naphtho(2,1-d)oxazole, naphtho(1,2-d)oxazole, naphtho(2,3-d)oxazole, 5-nitronaphtho(2,1-d)oxazole or the like) or the like}, an oxazoline nucleus (for example, 4,4-dimethyloxazoline or the like), a selenazole nucleus {a selenazole nucleus (for example, 4-methylselenazole, 4-nitroselenazole, 4-phenylselenazole or the like), a benzoselenazole nucleus (for example, benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole or the like), a naphthoselenazole nucleus (for example, naphtho(2,1-d)selenazole, naphtho(1,2-d)selenazole or the like) or the like}, a selenazoline nucleus (for example, selenazoline, 4-methylselenazoline or the like), a tellurazole nucleus {a tellurazole nucleus (for example, tellurazole, 4-methyltellurazole, 4-phenyltellurazole or the like), a benzotellurazole nucleus (for example, benzotellurazole, 5-chlorobenzotellurazole, 5-methylbenzotellurazole, 5,6-dimethylbenzotellurazole, 6-methoxybenzotellurazole or the like), a naphthotellurazole nucleus (for example, naphtho(2,1-d)tellurazole, naphtho(1,2-d)tellurazole or the like) or the like}, a tellurazoline nucleus (for example, tellurazoline, 4-methyltellurazoline or the like), a 3,3-dialkylindolenine nucleus (for example, 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3,5-trimethyl-5-chloroindolenine or the like), an imidazole nucleus {an imidazole nucleus (for example 1-alkylimidazole, 1-arylimidazole, 1-alkyl-4-phenylimidazole or the like), a benzimidazole nucleus (for example, 1-alkylbenzimidazole, 1-alkyl-5-chlorobenzimidazole, 1-alkyl-5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-chloro-5-cyanobenzimidazole, 1-alkyl-6-chloro-5-trifluoromethylbenzimidazole, 1-allyl-5,6-dichlorobenzimidazole, 1-allyl-5-chlorobenzimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole or the like), a naphthimidazole nucleus (for example, 2-alkylnaphtho(1,2-d)imidazole, 1-arylnaphtho(1,2-d)imidazole or the like). In the above, each alkyl group is preferably one having 1 to 8 carbon atoms, for example an unsubstituted alkyl group such as a methyl, ethyl, propyl, isopropyl, butyl or the like, a hydroxyalkyl group (for example, 2-hydroxyethyl or 3-hydroxypropyl or the like) or the like. A methyl or ethyl group is particularly preferable. In the above, each aryl group represents phenyl, halogen (for example, chlorine)-substituted phenyl, alkyl (for example, methyl)-substituted phenyl, alkoxy (for example, methoxy)-substituted phenyl or the like.}, a pyridine nucleus (for example, 2-pyridine, 4-pyridine, 5-methyl-2-pyridine, 3-methyl-4-pyridine or the like), a quinoline nucleus {a quinoline nucleus (for example, 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-methoxy-4-quinoline, 6-chloro-4-quinoline or the like), an isoquinoline nucleus (for example, 6-nitro-1-isoquinoline, 3,4-dihydro-1-isoquinoline, 6-nitro-3-isoquinoline or the like) or the like}, an imidazo(4,5-b)quinoxaline nucleus (for example, 1,3-diethylimidazo(4,5-b)quinoxaline, 6-chloro-1,3-dialkylimidazo(4,5-b)quinoxaline or the like), an oxadiazole nucleus, a thiadiazole nucleus, a tetrazole nucleus, a pyrimidine nucleus and the like. A benzothiazole ring and a benzoxazole nuclei are preferable.

$R_2$, $R_3$ and $R_7$ each may take a form of a quaternary substituent of an arbitrary cyanine dye.

Preferred examples of each of $R_2$, $R_3$ and $R_7$ include an unsubstituted alkyl group having 18 or less carbon atoms (for example, a methyl, ethyl, propyl, butyl, pentyl, octyl, decyl, dodecyl or octadecyl group or the like), or a substituted alkyl group {preferably, an alkyl group having 18 or less carbon atoms as substituted, for example, with a carboxyl group, a sulfo group, a cyano group, halogen atom(s) (for example, fluorine, chlorine or bromine atom(s) or the like), a hydroxyl group, an alkoxycarbonyl group having 8 or less carbon atoms (for example, a methoxycarbonyl, ethoxycarbonyl, phenoxycarbonyl, or benzyloxycarbonyl group or the like), a substituted or unsubstituted alkoxy group having 8 or less carbon atoms (for example, a methoxy, ethoxy, benzyloxy or phenethyloxy group or the like), an aryloxy group having 10 or less carbon atoms (for example, a phenoxy or p-tolyloxy group or the like), an acyloxy group having 3 or less carbon atoms (for example, an acetyloxy, or propionyloxy group or the like), an acyl group having 8 or less carbon atoms (for example, an acetyl, propionyl, benzoyl or mesyl group or the like), a substituted or substituted carbamoyl group (for example, a carbamoyl, N,N-dimethylcarbamoyl, morpholinocarbonyl, or piperidinocarbonyl group or the like), a substituted or unsubstituted sulfamoyl group (for example, a sulfamoyl, N,N-dimethylsulfamoyl, morpholinosulfonyl or piperidinosulfonyl group or the like), a substituted or unsubstituted aryl group having 10 or less carbon atoms (for example, a phenyl, 4-chlorophenyl, 4-methylphenyl, or α-naphthyl group or the like), or the like }.

$D_1$ and $D_1'$, and $D_2$ and $D_2'$ each represent atomic groups necessary for forming an acidic nucleus as previously defined, and each may take a form of an acidic nucleus of various general merocyanine dyes. Preferably, $D_1$ and $D_2$ each are cyano, sulfo or carbonyl groups, and $D_1'$ and $D_2'$ each represent the remaining atomic groups necessary for forming an acidic nucleus.

When the acidic nucleus is non-cyclic, that is, when $D_1$ and $D_1'$, or $D_2$ and $D_2'$ are mutually independent groups, terminal portion of the methine bond is a group such as malononitrile, alkylsulfonylacetonitrile, cyanomethyl benzofuranyl ketone or cyanomethyl phenyl ketone.

$D_1$ and $D_1'$, or $D_2$ and $D_2'$ may also combine to form a 5- or 6-membered heterocyclic ring consisting of carbon, nitrogen and chalcogen (typically, oxygen, sulfur, selenium and tellurium) atoms. Preferably, $D_1$ and $D_1'$, or $D_2$ and $D_2'$ combine to form the following nucleus:

2-pyrazolin-5-one, pyrazolidine-3,5-dione, imidazolin-5-one, hydantoin, 2-or 4-thiohydantoin, 2-iminooxazolidin-4-one, 2-oxazolidin-5-one, 2-thixazolidine-2,4-dione, isoxazolin-5-one, 2-thiazolin-4-one, thiazolin-4-one, thiazoline-2,4-dione, rhodanine, thiazolidine-2,4-dithione, isorhodanine, indane-1,3-dione, thiophen-3-one, thiophen-3-one-1,1-dioxide, indolin-2-one, indolin-3one, indazolin-3-one, 2-oxoindazolinium, 3-oxoindazolinium, 5,7-dioxo-6,7-dihydrothiazolo(3,2-a)pyrimidine, cyclohexane-1,3-dione, 3,4-dihydroisoquinolin-4-one, 1,3-dioxane-4,6-dione, barbituric acid, 2-thiobarbituric acid, chroman-2,4-dione, indazolin-2-one or pyrido(1,2-a)pyrimidine-1,3-dione.

More preferably, the nucleus is 1,3-dialkylbarbituric acid, 1,3-dialkyl-2-thiobarbituric acid or 3-alkylrhodanine wherein each alkyl group is preferably an unsubstituted alkyl group).

Preferred examples of a substituent linking to nitrogen atom(s) contained in the nucleus include a hydrogen atom, an alkyl group having 1 to 18, preferably 1 to 7 or particularly preferably 1 to 4 carbon atoms (for example, a methyl, ethyl, n-propyl isopropyl, n-butyl, isobutyl, hexyl, octyl, dodecyl or octadecyl group or the like), a substituted alkyl group {for example, an aralkyl group (for example, a benzyl or 2-phenylethyl group or the like), a hydroxyalkyl group (for example, a 2-hydroxyethyl or 3-hydroxypropyl group or the like), a carboxyalkyl group (for example, a 2-carboxyethyl, 3-carboxypropyl, 4-carboxybutyl or carboxymethyl group or the like), an alkoxyalkyl group (for example, a 2-methoxyethyl or 2-(2-methoxyethoxy)ethyl group or the like), a sulfoalkyl group (for example, a 2-sulfoethyl, 3-sulfopropyl, 3-sulfobutyl, 4-sulfobutyl, 2-(3-sulfopropoxy)ethyl, 2-hydroxy-3-sulfopropyl or 3-sulfopropoxyethoxyethyl group or the like), a sulfatoalkyl group (for example, a 3-sulfatopropyl or 4-sulfatobutyl group or the like), a heterocyclic ring-substituted alkyl group (for example, a 2-(pyrrolidin-2-on-1-yl)ethyl, tetrahydrofurfuryl or 2-morpholinoethyl group or the like), a 2-acetoxyethyl group, a carbomethoxymethyl group, a 2-methanesulfonylaminoethyl group or the like}, an allyl group, an aryl group (for example, a phenyl or 2-naphthyl group or the like), an unsubstituted aryl group (for example, a 4-carboxyphenyl, 4-sulfophenyl, 3-chlorophenyl or 3-methylphenyl group or the like), and a heterocyclic group (for example, a 2-pyridyl or 2-thiazolyl group or the like).

Each of $R_4$ and $R_5$ is a substituent of a tertiary amine used in synthesis, and thus includes any of substituents of general tertiary amines.

$R_4$ and $R_5$ may be the same or different, and preferably include unsubstituted alkyl groups each having 18 or less carbon atoms (for example, methyl, ethyl, propyl, butyl, pentyl, octyl, decyl, dodecyl or octadecyl groups or the like), or substituted alkyl groups {preferably, alkyl groups having 18 or less carbon atoms as substituted, for example, with a carboxyl group, a sulfo group, a cyano group, halogen atom(s) (for example, fluorine, chlorine or bromine atoms or the like), a hydroxyl group, an alkoxycarbonyl, aryloxycarbonyl or aralkyloxycarbonyl group having 8 or less carbon atoms (for example, a methoxycarbonyl, ethoxycarbonyl, phenoxycarbonyl or benzyloxycarbonyl group or the like), a substituted or unsubstituted alkoxy group having 8 or less carbon atoms (for example, a methoxy, ethoxy, benzyloxy or phenethyloxy group or the like), a monocyclic aryloxy group having 10 or less carbon atoms (for example, a phenoxy or p-tolyloxy group or the like), an acyloxy group having 3 or less carbon atoms (for example, an acetyloxy or propionyloxy group or the like), an acyl group having 8 or less carbon atoms (for example, an acetyl, propionyl, benzoyl or mesyl group or the like), a substituted or unsubstituted carbamoyl group (for example, a carbamoyl, N,N-dimethylcarbamoyl, morpholinocarbonyl or piperidinocarbonyl group or the like), a substituted or unsubstituted sulfamoyl group (for example, a sulfamoyl, N,N-dimethylsulfamoyl, morpholinosulfonyl or piperidinosulfonyl group or the like), a substituted or unsubstituted aryl group having 10 or less carbon atoms (for example, a phenyl, 4-chlorophenyl, 4-methylphenyl or α-naphthyl group or the like), or the like as substituent(s)}, cyano groups, alkoxy groups (for example, methoxy or ethoxy groups or the like), aryloxy groups (for example, phenoxy groups or the like), or alkoxycarbonyl groups (for example, ethoxycarbonyl groups or the like).

Further, $R_4$ and $R_5$ may combine to form a heterocyclic ring except an aromatic heterocyclic ring. Preferred example of such a heterocyclic ring include pyrrolidine, piperidine, morpholine, piperazine, tetrahydropyridine, dihydropyridine, tetrahydroquinoline and the like.

More preferred $R_4$ and $R_5$ are ethyl groups.

Preferred examples of a heterocyclic ring formed containing $Q_2$ include a pyrrole nucleus, a carbazole nucleus, an indole nucleus, a pyrazole nucleus, a pyrazolo(1,5-a)benzimidazole nucleus, a pyrazole(1,5-b)quinazolone nucleus, an indazole nucleus and the like.

A 5- or 6-membered heterocyclic ring formed containing $W_1$ or $W_2$ is one represented by removing an oxo group or a thioxo group at an appropriate position of a heterocyclic ring formed containing $D_1$ and $D_1'$, or $D_2$ and $D_2'$.

Preferred $R_6$ and $R_8$ are identical to examples of the substituent(s) previously stated as those linking to nitrogen atom(s) contained in the nucleus of a heterocyclic ring formed containing $D_1$ and $D_1'$, or $D_2$ or $D_2'$.

Ar represents an aromatic group, and is preferably a substituted or unsubstituted aryl group (for example, a phenyl, 3-chlorophenyl or naphthyl group or the like).

Each of $L_1$, $L_2$, $L_3$, $L_4$, $L_5$, $L_6$, $L_7$, $L_8$, $L_9$, $L_{10}$, $L_{11}$, $L_{12}$, $L_{13}$, $L_{14}$, $L_{15}$, $L_{16}$, $L_{17}$ $L_{18}$, $L_{19}$, $L_{20}$, $L_{21}$, $L_{22}$, $L_{23}$, $L_{24}$, $L_{25}$, $L_{26}$, $L_{27}$, $L_{28}$, $L_{29}$, $L_{30}$, $L_{31}$, $L_{32}$, $L_{33}$ and $L_{34}$ represents a methine group {which may optionally be substituted with a substituted or unsubstituted alkyl group (for example, a methyl or ethyl group or the like), a substituted or unsubstituted aryl group (for example, a phenyl group or the like) or a halogen atom (for example, a chlorine or bromine atom or the like)}, or alternatively may form a ring together with another methine group or an auxochrome.

Specific examples of methine dyes used in the present invention are illustrated below, but the scope of the present invention should not be interpreted to be limited thereto.

Examples of compounds represented by the general formula (II):

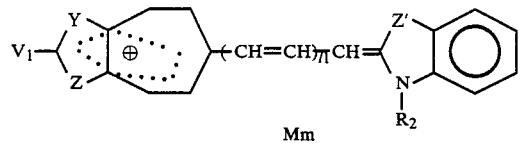

Mm

| Compound | Y | Z | V₁ | Z' | R₂ | l₁ | M | m |
|---|---|---|---|---|---|---|---|---|
| (1) | N | N—CH₃ | H | S | C₂H₅ | 0 | I⁻ | 1 |
| (2) | N | N—CH₃ | SCH₃ | S | C₂H₅ | 0 | I⁻ | 1 |
| (3) | N | N—CH₃ | Cl | S | C₂H₅ | 0 | I⁻ | 1 |
| (4) | N | N—CH₃ | OCH₃ | S | C₂H₅ | 0 | I⁻ | 1 |
| (5) | N | N—CH₃ | —C₆H₅ | S | C₂H₅ | 0 | I⁻ | 1 |
| (6) | N | N—C₂H₅ | SCH₃ | N—C₂H₅ | C₂H₅ | 0 | I⁻ | 1 |
| (7) | N | N—CH₃ | SCH₃ | O | C₂H₅ | 0 | I⁻ | 1 |
| (8) | N | N—(CH₂)₄SO₃⁻ | —C₆H₅ | O | CH₂CO₂H | 0 | — | — |
| (9) | N | N—CH₃ | —C₆H₅ | Se | C₂H₅ | 1 | CH₃—C₆H₄—SO₃⁻ | 1 |
| (10) | N | N—CH₃ | SCH₃ | S | C₂H₅ | 1 | I⁻ | 1 |
| (11) | N | N—CH₃ | —H | N—CH₃ | CH₃ | 2 | I⁻ | 1 |
| (12) | N | N—CH₃ | OCH₃ | S | CH₃ | 3 | I⁻ | 1 |
| (13) | N | S | SCH₃ | O | C₂H₅ | 0 | I⁻ | 1 |
| (14) | N | O | H | S | CH₃ | 1 | I⁻ | 1 |
| (15) | N | Se | H | Se | CH₃ | 1 | I⁻ | 1 |
| (16) | N | N—CH₃ | —Cl | CH₃\C/CH₃ | CH₃ | 2 | ClO₄⁻ | 1 |
| (17) | CH | N—CH₃ | —Cl | S | C₂H₅ | 3 | I⁻ | 1 |
| (18) | CH | O | —Cl | S | C₂H₅ | 0 | I⁻ | 1 |
| (19) | CH | S | —Cl | O | C₂H₅ | 0 | Br⁻ | 1 |

(20)

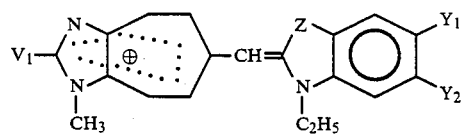

(21)

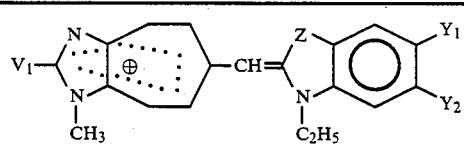

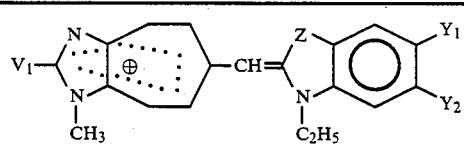

-continued
| Compound | V₁ | Z | Y₁ | Y₂ |
|---|---|---|---|---|
| (22) | 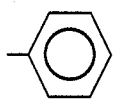 | O | OCH₃ | OCH₃ |
| (23) | SCH₃ | S | CH₃ | CH₃ |
| (24) | H | N—C₂H₅ | CH₃ | H |
| (25) | 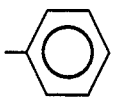 | S | NO₂ | H |
| (26) | H | S | Cl | Cl |
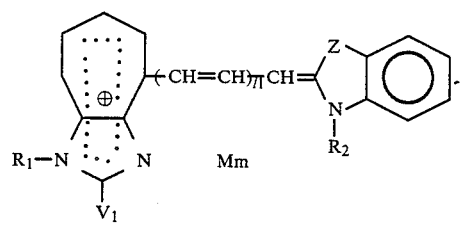
| Compound | V₁ | R₁ | Z | R₂ | l₁ | M | m |
|---|---|---|---|---|---|---|---|
| (27) | SCH₃ | CH₃ | S | C₂H₅ | 0 | I⁻ | 1 |
| (28) | SCH₃ | (CH₂)₃SO₃⁻ | S | (CH₂)₃SO₃H.N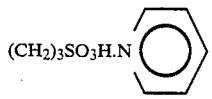 | 0 | — | — |
| (29) | 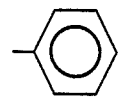 | CH₂CO₂H | O | C₂H₄OCH₃ | 1 | Cl⁻ | 1 |
| (30) | 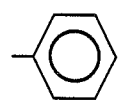 | CH₃ | Se | C₂H₅ | 2 | I⁻ | 1 |
(31)
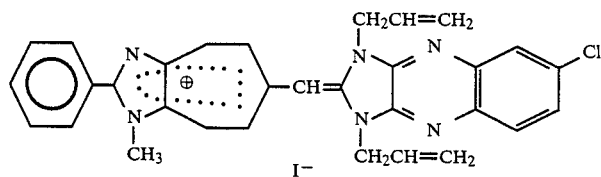
(32)
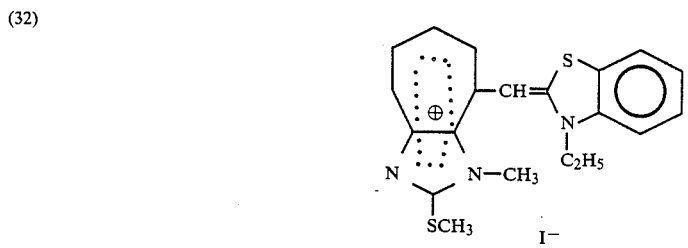

(33) 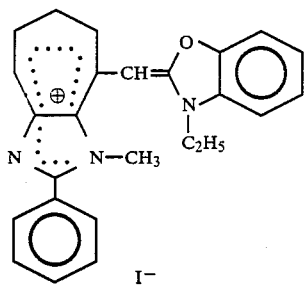
Examples of compounds represented by the general formula (III):
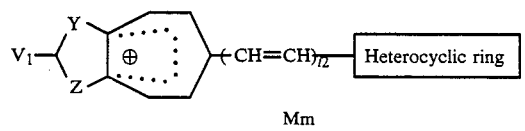
| Compound | Y | Z | $V_1$ | $l_2$ | M | m | Heterocyclic ring |
|---|---|---|---|---|---|---|---|
| (34) | N | N—CH₃ | phenyl | 1 | I⁻ | 1 | N-ethyl indole |
| (35) | N | N—C₂H₅ | SCH₃ | 1 | Br⁻ | 1 | 1,2-diphenyl indole |
| (36) | N | N—CH₃ | Cl | 1 | H₃C—C₆H₄—SO₃⁻ | 1 | 1,5-diphenyl pyrazole |
| (37) | N | N—(CH₂)₄SO₃⁻ | OCH₃ | 1 | — | — | N-ethyl pyrrole |
| (38) | N | N—CH₃ | phenyl | 1 | I⁻ | 1 | pyrazole derivative |

-continued
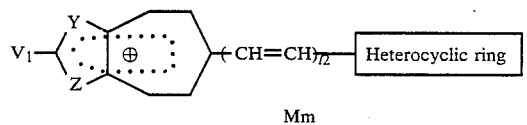
| Compound | Y | Z | V₁ | l₂ | M | m | Heterocyclic ring |
|---|---|---|---|---|---|---|---|
| (39) | N | O | SCH₃ | 1 | I⁻ | 1 | (3-methyl-9-ethylcarbazole) |
| (40) | N | N—CH₃ | (phenyl) | 1 | Br⁻ | 1 | (1-methyl-3-methyl-pyrazolo-benzimidazole) |
(41)
(42)
Examples of compounds represented by the general formula (IV):
| Compound | Y | Z | V₁ | l₃ | M | m |
|---|---|---|---|---|---|---|
| (43) | N | N—CH₃ | H | 0 | I⁻ | 1 |
| (44) | N | N—CH₃ | SCH₃ | 0 | I⁻ | 1 |
| (45) | N | N—CH₃ | SCH₃ | 1 | I⁻ | 1 |

-continued
| Compound | Y | Z | $V_1$ | $l_3$ | M | m |
|---|---|---|---|---|---|---|
| (46) | N | N—(CH$_2$)$_3$SO$_3^-$ | 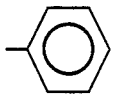 | 0 | Na$^+$ | 1 |
| (47) | N | S | 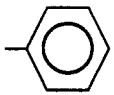 | 1 | Br$^-$ | 1 |
| (48) | N | O | SCH$_3$ | 1 | Br$^-$ | 1 |
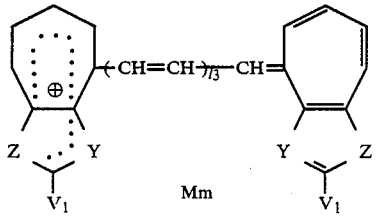
| (49) | N | N—CH$_3$ | SCH$_3$ | 0 | I$^-$ | 1 |
| (50) | N | N—CH$_3$ | SCH$_3$ | 1 | I$^-$ | 1 |
| (51) | N | N—(CH$_2$)$_4$SO$_3^-$ | 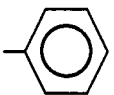 | 0 | HN$^+$(C$_2$H$_5$)$_3$ | 1 |
| (52) | N | N—CH$_3$ | 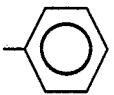 | 1 | CF$_3$SO$_3^-$ | 1 |
| (53) | N | N—CH$_2$CO$_2$H | H | 1 | Cl$^-$ | 1 |
(54)
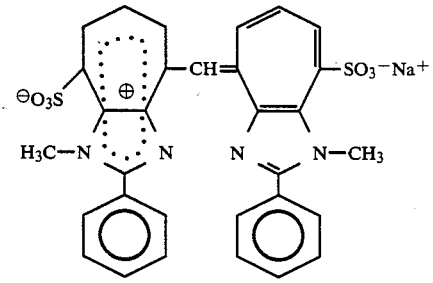
(55)
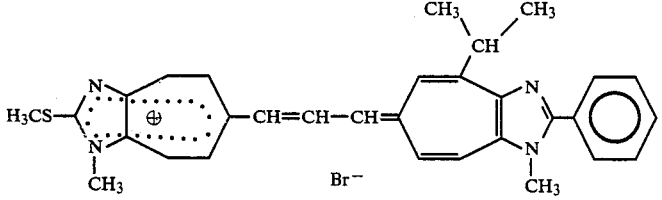
(56)
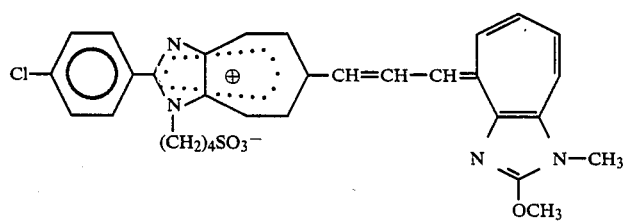

Examples of compounds represented by the general formula (V):

| Compound | Y | Z | $V_1$ | $l_4$ | M | m | Acidic nucleus |
|---|---|---|---|---|---|---|---|
| (57) | N | N—$CH_3$ | H | 0 | — | — | 3-ethyl-rhodanine |
| (58) | N | N—$CH_3$ | $SCH_3$ | 0 | — | — | 1,3-diethyl-2-thiobarbituric acid |
| (59) | N | N—$CH_3$ | $SCH_3$ | 0 | — | — | 1,3-di-n-butyl-barbituric acid |
| (60) | N | N—$CH_3$ | $SCH_3$ | 1 | — | — | 3-ethyl-rhodanine |
| (61) | N | N—$C_2H_5$ | phenyl | 2 | — | — | 3-ethyl-2-thio-oxazolidine-2,4-dione |
| (62) | N | N—$(CH_2)_3SO_3^-$ | H | 1 | $Na^+$ | 1 | 1,3-diethyl-2-thiobarbituric acid |
| (63) | N | S | $SCH_3$ | 2 | $K^+$ | 1 | 1-ethyl-3-(3-sulfopropyl)-2-thiobarbituric acid |
| (64) | N | N—$CH_3$ | $SCH_3$ | 0 | — | — | malononitrile |

-continued
| Compound | Y | Z | $V_1$ | $l_4$ | M | m | Acidic nucleus |
|---|---|---|---|---|---|---|---|
| (65) | N | N—$CH_3$ | 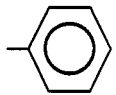 | 0 | — | — |  |
| (66) | N | N—$C_2H_5$ | H | 0 | — | — | 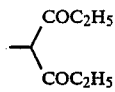 |
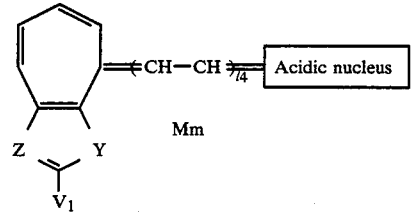
| (67) | N | N—$CH_3$ | H | 0 | — | — | 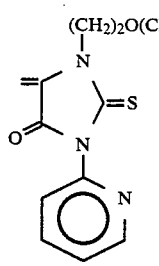 |
| (68) | N | N—$CH_3$ | 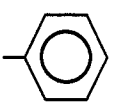 | 1 | — | — | 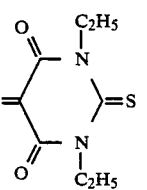 |
| (69) | N | N—$C_2H_5$ | $SCH_3$ | 1 | — | — | 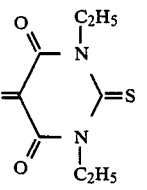 |
| (70) | N | N—$C_2H_5$ | H | 1 | — | — | 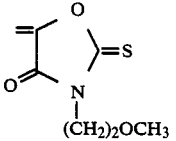 |
| (71) | N | S | H | 2 | — | — | 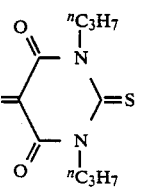 |
| (72) | N | N—$CH_3$ | 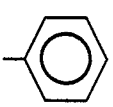 | 0 | — | — |  |

-continued

| Compound | Y | Z | V$_1$ | l$_4$ | M | m | Acidic nucleus |
|---|---|---|---|---|---|---|---|
| (73) | N | N—C$_2$H$_5$ | H | 1 | — | — | =C(CN)(SO$_2$C$_2$H$_5$) |

Examples of compounds represented by the general formula (VI):

| Compound | Y | Z | V$_1$ | R$_4$ | R$_5$ | M | m |
|---|---|---|---|---|---|---|---|
| (74) | N | N—CH$_3$ | phenyl | C$_2$H$_5$ | C$_2$H$_5$ | I$^-$ | 1 |
| (75) | N | N—CH$_3$ | —SCH$_3$ | C$_2$H$_5$ | C$_2$H$_5$ | I$^-$ | 1 |
| (76) | N | N—C$_2$H$_5$ | H | —(CH$_2$)$_2$O(CH$_2$)$_2$— | | Br$^-$ | 1 |
| (77) | N | N—CH$_3$ | SCH$_3$ | C$_2$H$_5$ | C$_2$H$_5$ | I$^-$ | 1 |
| (78) | N | N—(CH$_2$)$_4$SO$_3^-$ | phenyl | —(CH$_2$)$_4$— | | — | — |
| (79) | N | S | SCH$_3$ | —(CH$_2$)$_5$— | | I$^-$ | 1 |

Examples of compounds represented by the general formula (VII):

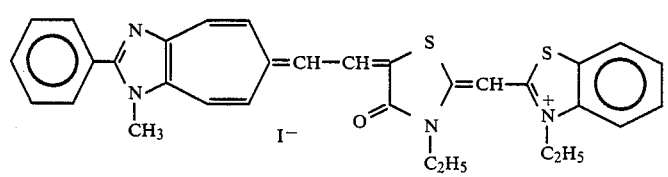

(80)

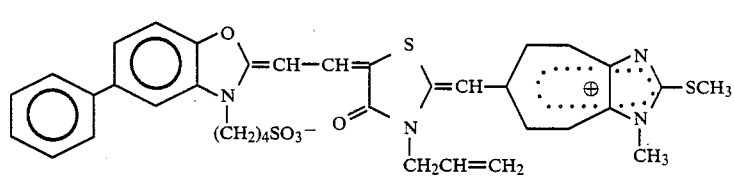

(81)

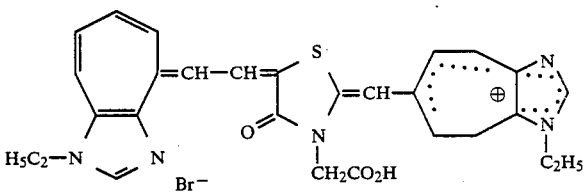
(82)
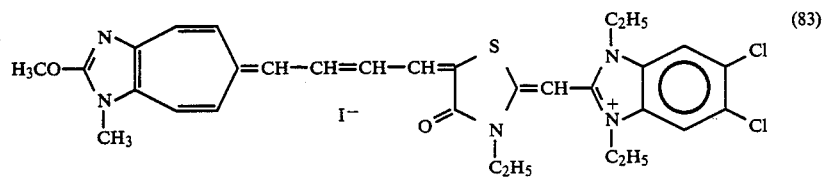
(83)
Examples of compounds represented by the general formula (VIII):
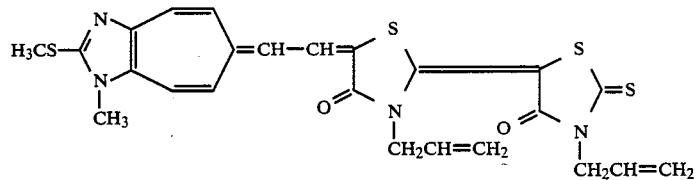
(84)
(85)
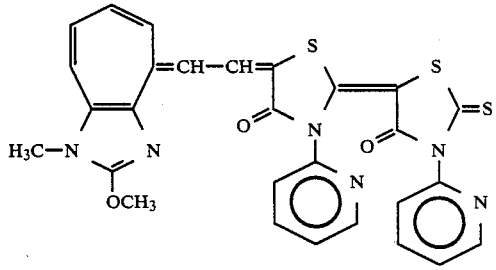
(86)
Examples of compounds represented by the general formula (IX):
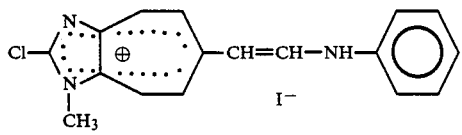
(87)
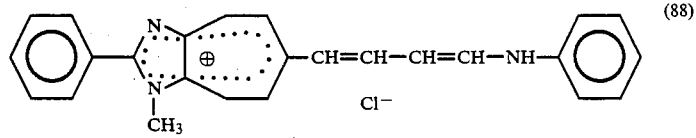
(88)

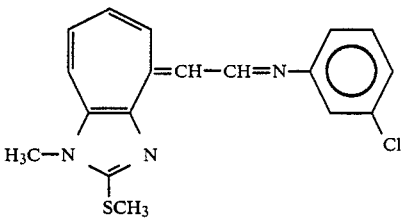

(89)

Synthetic processes of dyes used in the present invention are basically classified into the following two categories.

In the first synthetic process, a heteroazulene nucleus having a positive charge is used as a starting substance. A carbon atom in the heteroazulene nucleus having a positive charge (carbocation) is attacked by a nucleophilic agent. By selecting a suitable nucleophilic agent, a methine dye having a methine bond at the carbon atom which was nucleophilically attacked may be obtained.

In the second synthetic process, a heteroazulene nucleus having a positive charge, at least one carbon atom of which has a methyl substituent is used as a starting substance. This methyl-substituted part is deprotonized with a base to form a carbon atom having a negative charge (carbanion), which is then attacked by an electrophilic agent. A methine dye having a methine bond at the methyl-substituted part is obtained by selecting a proper electrophilic agent.

Though many heteroazulene nuclei are usable for the present invention, those which can readily be synthesized and are particularly useful include a cycloheptofuran nucleus, a cycloheptothiophene, a cycloheptopyrrole nucleus, a cycloheptoxazole nucleus, a cycloheptothiazole nucleus, a cycloheptimidazole nucleus, a cycloheptopyrazole nucleus, a cycloheptotriazole nucleus and the like, as disclosed in D. Ginsburg, Non-Benzenoid Aromatic Compounds, Chapter VII, pages 434 to 446, Interscience Publishers (1959).

As methods for giving each nucleus a positive charge, there is a method where a nitrogen atom is quaternarized when the nucleus has nitrogen atom(s), a method by an oxidation reaction when the nucleus does not have any nitrogen atom, and the like.

Explanation is made below on a cycloheptimidazole nucleus as a particularly preferred example.

(SYNTHETIC METHOD 1)

A methine dye of the present invention represented by the general formula (XII) may be prepared by condensing a cycloheptimidazolium ion represented by the general formula (X) with a precursor of auxochrome and methine bond as represented by the general formula (XI):

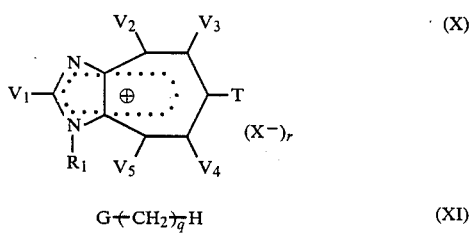

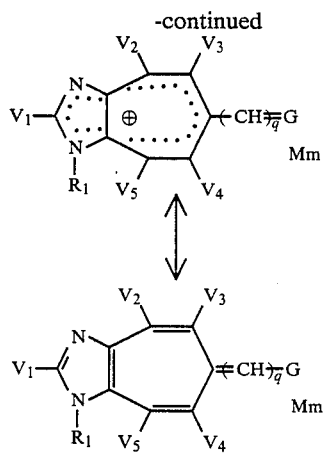

wherein G represents one of the formulae (XIII) and (XIV):

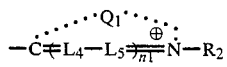

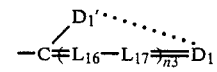

In the formulae (XIII) and (XIV), $R_2$, $Q_1$, $L_4$ and $L_5$ have the same meanings as those in the general formula (II), respectively, and $D_1$, $D_1'$, $L_{16}$ and $L_{17}$ have the same meanings as those in the general formula (V), respectively.

In the formulae (X) and (XII), $R_1$, $V_1$ to $V_5$, M and m have the same meanings as those in the general formula (I), respectively.

$X^-$ in the formula (X) represents an anion, and r represents a number necessary for neutralizing the charge of a compound represented by the formula (X).

Examples of an anion represented by $X^-$ are preferably those previously mentioned as examples of an anion of a charge balance counter ion M, particularly preferably a trifluoromethanesulfonate ion.

In the formula (X), T represents a hydrogen atom or an eliminable group generally used in organic synthetic chemistry, for example an eliminable group disclosed in Jerry March, "Advanced Organic Chemistry: Reactions, Mechanism and Structure", published by McGraw-hill Kogakusha (1977), pages 265 to 452. Preferred examples of such as elimiable group are halogen atoms (for example, chlorine, bromine or iodine atoms or the like), alkylthio groups (for example, ethylthio groups or the like), alkoxy groups (for example, methoxy groups or the like) and alkylsulfonyl groups (for example, methylsulfonyl groups or the like). A particularly preferred T group is a hydrogen atom.

q in the formulae (XI) and (XII) is 0 or 1.

The bonding position of T and the methine group in the formulae (X) and (XII) may be any of the 4-, 5-, 6-, 7- and 8-positions, as is in the general formula (I).

A compound of the formula (XI) wherein G represents a formula (XIII) and q is 1 is a methyl quaternary compound, and is used as a starting substance for the corresponding methylene base.

Reactions for condensing bases are well known techniques for the preparation of monomethinecyanine dyes. Such reactions are disclosed in T. H. James, *The Theory of The Photographic Process*, 4th edition, Macmillan, 1977, Chapter 8, page 206.

For condensation of a methylene base for preparing a cyanine dye, it is necessary for each of the two basic nuclei to be reacted to contain a reactive substance, and it has been found that a cycloheptimidazolium ion of the formula (X) comes under nucleophilic attack at a 7-membered carbon atom. The reaction is liable to occur at the 4-, 6- or 8-position, particularly at the 4- on 6-position depending or the electronic state. Thus, a condensation reaction of a methylene base and an activated cycloheptimidazolium ion can be carried out through a methylene base condensation reaction according to general methods used for the preparation of cyanine dyes.

Similarly, a compound of the formula (XI) wherein q is 0 and G is a group represented by the formula (XIV), which is a ketomethylene or a cyanomethylene, is condensed with an activated cycloheptimidazolium ion to form a merocyanine-like dye. As for the reaction position, there is the same tendency as in the above cyanine-like dye synthesis. That is, the reaction is liable to occur at the 4-, 6- or 8-position, particularly at the 4- or 6-position. Condensation reaction of a ketomethylene or a cyanomethylene with an activated cycloheptimidazolium ion may be carried out according to general methods used in preparation of merocyanine dyes.

Methods used for the preparation of cyanine dyes or merocyanine dyes may also be used for a condensation reaction of a compound of the formula (X) with a compound of the formula (XI). The condensation reaction may be carried out at room temperature or may be accelerated with heating.

Examples of usable reaction solvent(s) include acetonitrile, aliphatic or aromatic hydrocarbons or halogenated derivatives thereof such as benzene, toluene, xylene or decane; ether; pyridine; dimethylsulfoxide; dimethylformamide; and alcohols such as methanol and ethanol. Acetonitrile, pyridine, dimethylformamide, methanol and ethanol are particularly preferable.

For condensation using a methylene base, an organic base, for example a tertiary amine (for example, triethylamine, 1,8-diazabicyclo(5,4,0)-7-undecene (DBU) or the like), tetramethylguanidine or piperidine is used.

The first synthetic method for dyes used in the invention is useful for the preparation of a methine dye wherein a cycloheptimidazole nucleus is connected with a basic nucleus of a type found in cyanine dyes through one methine group, or a methine dye wherein a cycloheptimidazole nucleus is directly connected with an acidic nucleus of a type found in merocyanine dyes. Thus, methine dyes prepared by the first synthetic method are monomethine dyes of the general formula (II) and zeromethine dyes of the general formula (V).

A cycloheptimidazole nucleus symmetry monomethine or trimethyne dye may be synthesized by the reaction of a compound of the formula (X) with a malonic acid or a glutaconic acid (this method is similar to the first synthetic method) by applying a synthetic method disclosed in F. M. Hamer, *Heterocyclic Compounds-Cyanine Dyes and Related Compounds*, Chapter 2, pages 72 and 73, Chapter 4, page 111, John Wily and Sons Company (1964). According to the synthetic method, monomethine and trimethine dyes of the general formula (IV) may be synthesized. The reaction is liable to occur at the 4- or 6-position, particularly at the 4-position of the cycloheptimidazolium ion.

A method for synthesizing hemicyanine type dyes of the general formula (VI) as a special synthetic method similar to the first synthetic method is described below.

A dimethinehemicyanine type dye represented by the general formula (VI) may be synthesized by condensing a compound of the formula (X) with a tertiary amine having at least one ethyl group.

The reaction is liably to occur at the 4-, 6- or 8-position, particularly at the 4-position.

(SYNTHETIC METHOD 2)

The second synthetic method makes possible the synthesis of methine dyes each containing 2 or more methine groups which connect a cycloheptimidazole nucleus with the remaining basic or acidic nucleus.

Methine dyes which can be synthesized according to the second method are represented by the following formula (XV):

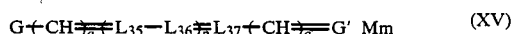

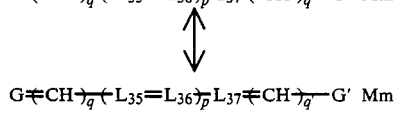
(XV)

Such a dye may be prepared by condensing a compound represented by the formula (XVI).

(XVI)

with a compound represented by the formula (XVII)

(XVII)

and then condensing the condensation product with a compound represented by the formula (XVIII)

(XVIII)

In the formulae, $Ar^1$ and $Ar^2$ are carbon ring aromatic groups, and G and G' each represent groups represented by the formula (XIX), (XIII) or (XIV):

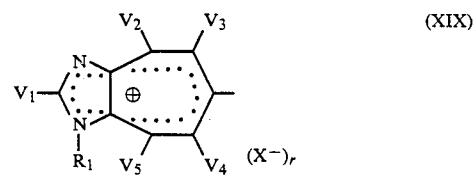
(XIX)

wherein $R_1$ and $V_1$ to $V_5$ have the same meanings as those in the general formula (I), respectively, and $X^-$ and r have the same meanings as those in the formula (X), respectively.

When G and G' in the formulae (XVII) and (XVIII) satisfy the formula (XIX), q and q' are 1, and at that time the bonding position of the methyl group may be any of the 4-, 5-, 6-, 7- and 8-positions, but preferably may be the 4-, 6- or 8-position, more preferably the 4- or 6-position.

Further, $L_{35}$, $L_{36}$ and $L_{37}$ in the formulae (XV), (XVI), (XVII) and (XVIII) represent optionally substituted methine groups, and each have the same meanings as $L_1$, $L_2$, $L_3$, $L_4$ and $L_5$ in the general formula (II).

q and q' are 0 or 1, and p is 0 or a positive integer and typically 0, 1, 2 or 3. At least one of G and G' represents the formula (XIX).

As apparent from the foregoing, a starting substance necessary for the second synthetic method of dyes used in the invention is a cycloheptimidazolium ion having a methyl substituent.

When a methine dye having only one cycloheptimidazole nucleus is synthesized, a compound of the formula (XVII) or (XVIII) wherein one of G and G' is represented by the formula (XVIII) or (XIV) is used.

A compound necessary as the remaining starting substance is that of the formula (XVI). When p is 0 and $L_{15}$ is —CH—, a compound of the formula (XVI) is apparently a diarylformamidine, typically diphenylformamidine. When p is a positive integer, a compound of the formula (XVI) obtained is an analog of a diarylformamidine or a vinylog.

A compound obtained by the reaction of an analog of a diarylformamidine or vinylog represented by the formula (XVI) with a compound of the formula (XVII) wherein G satisfies one of the formula (XIII) or (XIV) is an intermediate generally used for preparation of a cyanine dye or a merocyanine dye.

Though these intermediates are often used as such, their reactivities can be increased by acyl substitution of the N-hydrogen, for example by reaction with a carboxylic acid or an arhydride thereof. Acetyl-substituted intermediates are most generally used. When these intermediates each contain a quaternary ammonium nucleus as represented by the formula (XIII), they are often called I.C.I. intermediates. On the other hand, when these intermediates each contain a ketomethylene or cyanomethylene as represented by the formula (XIV), they are often called Dains intermediates. The methods using I.C.I. intermediates and Dains intermediates in the synthesis of cyanine dyes and merocyanine dyes are disclosed in T. H. James, *The Theory of the Photographic Process* pages 195 to 212 which is previously cited.

A new intermediate for the preparation of dyes is obtained by reacting an analog of a diarylformamidine or vinylog represented by the formula (XVI) with a compound of the formula (XVII) wherein G satisfies the formula (XIX). The obtained dye intermediate containing a cycloheptimidazole nucleus can be used similarly to an I.C.I. intermediate and a Dains intermediate known in the preparation of a methine dye.

A dye intermediate obtained by reacting a compound of the formula (XVI) with a compound of the formula (XVII), and if necessary acylacting the product can be represented by the formula (XX):

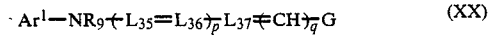

wherein $R_9$ represents hydrogen or acyl, and the remaining symbols are as previously defined.

A dye of the formula (XV) can be synthesized by condensing a compound of the formula (XVIII) with a dye intermediate of the formula (XX). The order of whole reactions from a starting substance to a final dye is similar to that in synthesis known in the preparation of a cyanine dye and a merocyanine dye, except for a methyl-substituted cycloheptimidazolium ion. Though the reaction generally progresses at room temperature, the reaction may be promoted according to necessity with heating. The reaction may also be carried out in the same solvent as that used in the aforementioned first synthetic method of a dye of the invention.

The second synthetic method is more useful than the first synthetic method in that a larger number of methine groups can be introduced in the dye and in that the substitution position of methine bond in the cycloheptimidazole nucleus is not arbitrary and the amount of by-products is small. Substituted or unsubstituted methine group(s) of a necessary number may be introduced according to the second synthetic method.

Since absorption of a dye having 1 or 2 or more cycloheptimidazole nuclei shifts to a deep color, it is in fact seldom necessary for obtaining absorption of a dye of long wavelength that p in the formula (XV) exceeds 3.

Though the above explanation was made citing as methine sources analogs of diarylformamidines or vinylogs represented by the formula (XVI), other methine sources, for example analogs of orthoesters or vinylogs may of course be used.

Methine dyes of the general formulae (II), (III), (IV), (V), (VI) and (IX) may be synthesized using the second synthetic method.

Further, methine dyes of the general formulae (VII) and (VIII) may be synthesized according to the first and second synthetic methods and F. M. Hamer, *Heterocyclic Compounds-Cyanine Dyes and Related Compounds*, John Wily and Sons Company (1964).

Compounds which satisfy the formulae (X) and (XIX) are cycloheptimidazolium ions as starting substances in the first and second synthetic methods, and synthesis of
(X): $R_1=CH_3$, $V_1=SCH_3$, $V_2$ to $V_5=H$, $T=H$
(XIX): $R_1=CH_3$, $V_1=SCH_3$, $V_2$ to $V_5=H$
as representative examples thereof is explained below.

2-Hydroxy-2,4,6-cycloheptatrien-1-one readily obtained according to a method disclosed in *Journal of the American Chemical Society*, vol. 37, No. 22, pages 5257 to 5259 (1965), or 2-hydroxy-5-methyl-2,4,6-cycloheptatrien-1-one readily obtained according to the method disclosed in *Bulletin of the Chemical Society of Japan*, vol. 32, pages 493 to 496 (1959) is 0-methylated with a methylating agent (for example, dimethyl sulfate) to obtain 2-methoxy-2,4,6-cycloheptatrien-1-one or 2-methoxy-5-methyl-2,4,6-cycloheptatrien-1-one, respectively, which is then condensed with thiourea to obtain 2-mercaptocycloheptimidazole or 2-mercapto-6-methylcycloheptimidazole, respectively. They are then each S-methylated with a methylating agent (for example, methyl iodide) to obtain 2-methylthiocycloheptimidazole or 6-methyl-2-methylthiocycloheptimidazole, respectively.

They are further each N-methylated with a methylating agent (for example, methyl trifluoromethanesulfonate) to obtain 3-methyl-2-methylthiocycloheptimidazolium ion or 3,6-dimethyl-2-methylthiocycloheptimidazolium ion.

The above overall scheme is as follows:

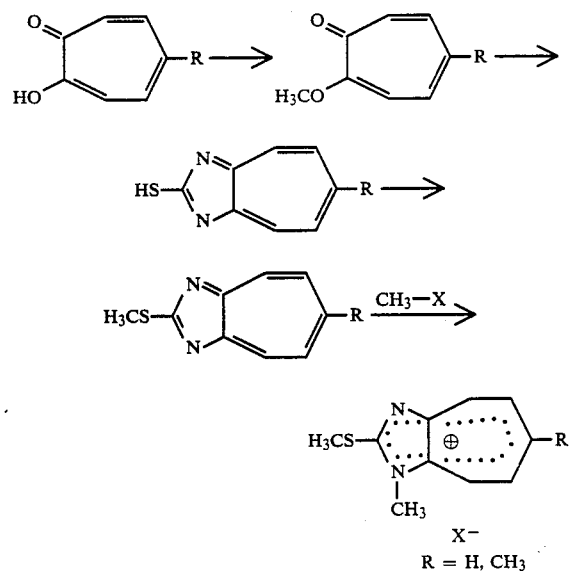

R = H, CH₃

(SYNTHETIC EXAMPLE)

Synthetic examples of the above dyes are exhibited below.

SYNTHETIC EXAMPLE 1: SYNTHESIS OF (2)

Synthesis of (2) is stated successively starting from synthesis of a raw material of the dye.

(a) Synthesis of 2-methoxy-2,4,6-cycloheptatrien-1-one

First, 200 g of 2-hydroxy-2,4,6-cycloheptatrien-1-one which is readily obtained according to the method disclosed in *Journal of the American Chemical Society*, vol. 87, No. 22, pages 5257 to 5259 (1965) and 340 g of potassium carbonate were added to 1.3 l of acetone containing 10% water, 310 g of dimethyl sulfate was added thereto and the mixture was refluxed with heating for 8 hours. After the mixture was allowed to stand overnight, deposited inorganic matters were filtered out and acetone was distilled away from the filtrate under reduced pressure. Then, 1 l of water was added to the concentrate, followed by extraction with chloroform (0.3 l×3). The chloroform layer was dried over anhydrous sodium sulfate, concentrated to evaporate the solvent and then distilled under reduced pressure (120° C./0.5 mmHg).

Colorless liquid 205.7 g (Yield 92.3%).

(b) Synthesis of 2-mercaptocycloheptimidazole

According to the method disclosed in *Journal of the American Chemical Society*, vol. 76, pages 3352 and 3353 (1954), 150 g of 2-methoxytropone and 84 g of thiourea were added to 255 g of a solution of 28% sodium methoxide in methanol, and stirred at room temperature for 30 minutes. Further, 600 ml of methanol was added thereto and acetic acid was added until the pH of the solution becomes around 5. Deposited crystals were filtered and washed with methanol. The obtained crystals were added to 1 l of methanol, and refluxed with heating for 30 minutes. After being allowed to cool to room temperature, the crystals were filtered and dried.

Yellow crystals 125 g (Yield 70.0%), Melting point 300° C. or more.

(c) Synthesis of 2-methylthiocycloheptimidazole

First, 38 g of potassium hydroxide was dissolved in 800 ml of methanol, 100 g of 2-mercaptocycloheptimidazole was added thereto, and the mixture was stirred with heating to the inner temperature of about 45° C. Then, 131.2 g of dimethyl sulfate was added dropwise thereto and stirred with heating to the inner temperature of about 45° C. for one hour. After the solvent was distilled away to some extent under reduced pressure, 1 l of water was added and extracted with chloroform (0.5 l×2). After being dried over anhydrous sodium sulfate, the chloroform layer was evaporated under reduced pressure to 200 ml, and 1 l of hexane was added thereto to deposit crystals, which were the filtered and dried.

Colorless crystals 89 g (Yield 82.0%), Melting point 101° to 102° C.

(d) Synthesis of 3-methyl-2-methylthiocycloheptimidazolium trifluoromethansulfonate First, 25 g of 2-methylthiocycloheptimidazole was added to 100 ml of anisole, and stirred under ice cooling. Then, 28 g of methyl trifluoromethanesulfonate was added dropwise and stirred under ice cooling. The mixture was further stirred at room temperature for 2 hours and 30 minutes, 200 ml of ethyl acetate was added thereto, and deposited crystals were filtered and dried.

Colorless crystals 39.7 g (Yield 82.0%), Melting point 163° to 164° C.

(e) Synthesis of (2)

First, 2.8 g of 3-methyl-2-methylthiocycloheptimidazolium trifluoromethanesulfonate and 2.3 g of 3-methyl-2-methylbenzothiazolium p-toluenesulfonate were added to 50 ml of acetonitrile, 2.3 ml of triethylamine was further added, and the mixture was refluxed with heating for one hour. After the solvent was distilled away under reduced pressure, the mixture was subjected to purification by silica gel column chromatography using a mixed solvent of methanol/chloroform=¼ as a developing solvent. The obtained crystals were added to 50 ml of methanol and heated to dissolve it. The insoluble matters were filtered out during hot state, a solution of 1.2 g sodium iodide in 5 ml of methanol was added to the filtrate, and the mixture was allowed to cool. Deposited crystals were filtered, washed with methanol and water, and dried.

Purple crystals 0.75 g (Yield 24%), Melting point 260° to 264° C., λmax=574 nm ($\epsilon=9.95\times 10^4$) (solvent methanol).

As by-product dyes in the synthesis of (2), slight amounts of dyes having a methine bond at the 4-position and the 8-position of the cycloheptimidazole nucleus, respectively are obtained. 4-position: Compound (27), 8-position: Compound (32).

Slight amounts of similar by-product dyes were also obtained in the following synthetic examples 2, 3, 4, 5, 6, 7, 8, 9 and 10 according to the first synthetic method.

SYNTHETIC EXAMPLE 2: SYNTHESIS OF (7)

First, 4 g of 3-methyl-2-methylthiocycloheptimidazolium trifluoromethanesulfonate as synthesized in Synthetic example 1 (d) and 3.53 g of 3-ethyl-2-methylbenzoxazolium p-toluenesulfonate were added to 50 ml of acetonitrile, 3 ml of triethylamine was further added, and the mixture was refluxed with heating for one hour. Then, 200 ml of ethyl acetate was added to the reaction solution and the deposited crystals were collected by filtration. The crystals were added to 100 ml of methanol and dissolved therein with heating. The insoluble matters were filtered out in a hot state, and a solution of 1.5 g of sodium iodide in 5 ml of methanol was added to the filtrate and allowed to cool. Deposited crystals were collected by filtration, washed with methanol and water, and dried.

Purple crystals 1.8 g (Yield 36%), Melting point 300° C. or more, $\lambda max = 547$ nm ($\epsilon = 1.05 \times 10^5$) (methanol).

SYNTHETIC EXAMPLE 3: SYNTHESIS OF (58)

First, 3 g of 3-methyl-2-methylthiocycloheptimidazolium trifluoromethanesulfonate as synthesized in Synthetic example 1 (d) and 1.77 g of N,N-diethylthiobarbituric acid were added to 30 ml of pyridine, and stirred with heating to the inner temperature of 50° C. for 30 minutes. Then, 200 ml of ethyl acetate was added to the reaction solution and deposited crystals were collected by filtration. The crystals were added to a mixed solvent of methanol (100 ml)/chloroform (200 ml) and dissolved therein under reflux with heating. The insoluble matters were filtered out in hot state, and the filtrate was concentrated to 120 ml under reduced pressure. After being allowed to stand at room temperature, the obtained crystals were collected by filtration, washed with methanol and dried. Red crystals 1 g (Yield 29.2%), Melting point 300° C. or more, $\lambda max = 530$ nm ($\epsilon = 5.18 \times 10^4$) (methanol).

SYNTHETIC EXAMPLE 4: SYNTHESIS OF (59)

First, 3 g of 3-methyl-2-methylthiocycloheptimidazolium trifluoromethanesulfonate as synthesized in Synthetic example 1 (d) and 2.1 g of N,N-di-n-butyl-barbituric acid were added to 30 ml of pyridine, and stirred with heating to the inner temperature of 50° C. for one hour. Then, 200 ml of water was added to the reaction solution and deposited crystals were collected by filtration. The crystals were dissolved in a mixed solvent of isopropanol (100 ml)/chloroform (100 ml), the insoluble matters were filtered out, and the filtrate was concentrated to 100 ml under reduced pressure. After being allowed to stand at room temperature, deposited crystals were collected by filtration, washed with isopropanol and dried.

Red crystals 1.06 g (Yield 28.0%), Melting point 219° to 221° C., $\lambda max = 516$ nm ($\epsilon = 4.59 \times 10^4$) (methanol).

SYNTHETIC EXAMPLE 5: SYNTHESIS OF (49)

First, 5 g of 3-methyl-2-methylthiocycloheptimidazolium trifluoromethanesulfonate as synthesized in Synthetic example 1 (d) and 0.84 g of malonic acid were added to 50 ml of pyridine, and refluxed with heating for 30 minutes. Then, 200 ml of water was added to the reaction solution, followed by addition of 2.2 g of sodium iodide. Deposited crystals were collected by filtration, and purified by silica gel column chromatography using a mixed solvent of methanol/chloroform = ¼ as a developing solvent. The resulting crystals were dissolved in a mixed solvent of methanol (50 ml)/chloroform (50 ml) and the insoluble matters were filtered out. The filtrate was concentrated to 60 ml and allowed to cool. Deposited crystals were collected by filtration, washed with methanol and dried.

Purple crystals 1.1 g (Yield 14.4%), Melting point 300° C. or more, $\lambda max = 674$ nm ($\epsilon = 6.49 \times 10^4$) (methanol).

SYNTHETIC EXAMPLE 6: SYNTHESIS OF (50)

First, 10 g of 3-methyl-2-methylthiocycloheptimidazolium trifluoromethanesulfonate as synthesized in Synthetic example 1 (d) and 3.82 g of glutaconic acid were added to 50 ml of pyridine, and stirred with heating to the inner temperature of 50° C. for one hour. Then, 200 ml of ethyl acetate was added to the reaction solution, and deposited crystals were collected by filtration. The crystals were dissolved in 1 of methanol under reflux with heating and the insoluble matters were filtered out. Then, a solution of 1 g of sodium iodide in 50 ml of methanol was added to the filtrate, and concentrated to 200 ml. Deposited crystals were collected by filtration, washed with methanol and water, and dried.

Deep purple crystals 2 g (Yield 12.5%), Melting point decomposed at about 200° C., $\lambda max = 774$ nm ($\epsilon = 1.14 \times 10^5$) (methanol).

SYNTHETIC EXAMPLE 7: SYNTHESIS OF (77)

First, 3 g of 3-methyl-2-methylthiocycloheptimidazolium trifluoromethanesulfonate as synthesized in Synthetic example 1 (d) was added to 30 ml of acetonitrile, 1.5 ml of triethylamine was further added, and the mixture was stirred with heating to the inner temperature of 60° C. for one hour. After the reaction, the solvent was distilled away, and the resulting crystals were purified by silica gel column chromatography using a mixed solvent of methanol/chloroform = ¼ as a developing solvent. The resulting crystals were dissolved in 10 ml of methanol, and a solution of 0.7 g of sodium iodide in 3 ml of methanol was added. After further addition of 100 ml of water, deposited crystals were collected by filtration, washed with methanol and dried.

Red crystals 0.5 g (Yield 13.7%), Melting point 219° to 221° C., $\lambda max = 522$ nm ($\epsilon = 8.12 \times 10^4$) (methanol).

SYNTHETIC EXAMPLE 8: SYNTHESIS OF (4)

Synthesis of (4) is stated below successively from synthesis of a raw material of the dye.

(a) Synthesis of 2-methoxycycloheptimidazole

First, 3 g of 2-methylthiocycloheptimidazole as synthesized according to Synthetic example 1 (c) with reference to the method disclosed in *Bulletin of the Chemical Society of Japan*, volume 33, No. 1, pages 56 to 58 (1960) was added to 50 ml of methanol, and 1 g of sodium methoxide was further added thereto. After reflux with heating for 10 hours, the solvent was distilled away, and 50 ml of benzene was added to the residue. The insoluble matters were filtered out, and the filtrate was concentrated. The resulting crystals were purified by silica gel column chromatography using ethyl acetate as a developing solvent.

Colorless crystals 1 g (Yield 36.8%), Melting point 94° C.

(b) Synthesis of 2-methoxy-3-methylcycloheptimidazolium trifluoromethanesulfonate First, 0.9 g of 2-methoxycycloheptimidazole was added to 5 ml of anisole, and 1.1 g of methyl trifluoromethanesulfonate was added dropwise. After being stirred at room temperature for one hour, 30 ml of ethyl acetate was added, and deposited crystals were collected by filtration and dried.

Colorless crystals 1.1 g (Yield 60.4%), Melting point 123° to 124° C.

(c) Synthesis of (4)

2-Methoxy-3-methylcycloheptimidazolium trifluoromethanesulfonate (1 g) and 1.08 g of 3-ethyl-2-methylbenzothiazolium p-toluenesulfonate were added to 30 ml of acetonitrile, 0.86 ml of triethylamine was further added, and the mixture was refluxed with heating for 40 minutes. Solvent was distilled away, and the residue was subjected to purification by silica gel column chromatography using a mixed solvent of methanol/chloroform=¼ as a developing solvent The resulting crystals were dissolved in 50 ml of methanol, the insoluble matters were filtered out in a hot state, and then a solution of 0.5 g of sodium iodide in 5 ml of methanol was added to the filtrate. Deposited crystals were collected by filtration, washed successively with methanol and water, and dried.

Red crystals 0.2 g (Yield 13.9%), Melting point 190° to 191° C., $\lambda max = 557$ nm ($\epsilon = 1.04 \times 10^5$) (methanol).

SYNTHETIC EXAMPLE 9: SYNTHESIS OF (3)

Synthesis of (3) is stated below in order from synthesis of a raw material of the dye.

(a) Synthesis of 2-hydroxycycloheptimidazole

First, 60 g of 2-methylthiocycloheptimidazole as synthesized according to Synthetic example 1 (c) with reference to the method disclosed in *Journal of the American Chemical Society*, vol. 76, pages 3352 and 3353 (1954) was added to 300 ml of concentrated hydrochloric acid (hydrogen chloride 35%), and refluxed with heating for 2 hours and 30 minutes. Then, 500 ml of ethanol was added, and after stirring at room temperature, deposited crystals were collected by filtration. The crystals were dissolved in 0.5 l of water, and pH was adjusted to around 7 with sodium bicarbonate. Deposited crystals were collected by filtration, washed with water and dried.

Pale yellow crystals 40 g (Yield 80.3%), Melting point 245° C.

(b) Synthesis of 2-chlorocycloheptimidazole

With reference to the method disclosed in *Chemical and Pharmaceutical Bulletin*, vol. 16, No. 7, pages 1300 to 1307 (1968), 10 g of 2-hydroxycycloheptimidazole, 150 g of phosphorus oxychloride and 12 g of N,N-diethylaniline were stirred with heating to the inner temperature of 70° C. for 6 hours and 30 minutes. After the reaction, phosphorus oxychloride was distilled away under reduced pressure and 500 ml of ice water was added to the residue. Then, a sodium bicarbonate solution was added thereto to neutral pH, and extracted with chloroform (250 ml×2). The chloroform layer was dried over anhydrous sodium sulfate, solvent was distilled away, and the residue was purified by silica gel column chromatography using ethyl acetate as a developing solvent.

Colorless crystals 2.7 g (Yield 24%), Melting point 162° to 163° C.

(c) Synthesis of 2-chloro-3-methylcycloheptimidazolium trifluoromethanesulfonate 2-Chlorocycloheptimidazole (0.78 g) was added to 4 ml of anisole, 0.93 g of methyl trifluoromethanesulfonate was added dropwise thereto, and the mixture was stirred at room temperature for 40 minutes. Then, 50 ml of ethyl acetate was added to the reaction solution, and deposited crystals were collected by filtration and dried.

Colorless crystals 1.27 g (Yield 81.5%), Melting point 109° to 110° C.

(d) Synthesis of (3)

First, 1,2 g of 2-chloro-3-methylcycloheptimidazolium trifluoromethanesulfonate and 1.28 g of 3-ethyl-2-methylbenzothiazolium p-toluenesulfonate were added to 30 ml of acetonitrile, 1 ml of triethylamine was further added, and the mixture was refluxed with heating for one hour and 30 minutes. After the reaction, solvent was distilled away therefrom, and the residue was purified by silica gel column chromatography using a mixed solvent of methanol/chloroform=¼ as a developing solvent. The resulting crystals were dissolved in 100 ml of methanol, the insoluble matters were filtered out, and a solution of 0.6 g of sodium iodide in 5 ml of methanol was added to the filtrate. After being allowed to stand at room temperature for a while, deposited crystals were collected by filtration, washed with a small amount of methanol and dried.

Red crystals 100 mg (Yield 5.7%), Melting point decomposed at 120° C., $\lambda max = 522$ nm ($4.32 \times 10^4$) (methanol).

SYNTHETIC EXAMPLE 10: SYNTHESIS OF (1)

Synthesis of (1) is stated below in turn from synthesis of the starting substance of the dye.

(a) Synthesis of cycloheptimidazole

With reference to *Journal of the American Chemical Society*, vol. 76, pages 3352 and 3353 (1954) 23 g of 2-mercaptocycloheptimidazole as synthesized in Synthetic example 1(b) was added to 210 ml of 10% nitric acid, and stirred with heating to the inner temperature of 80° to 90° C. for one hour. The reaction solution was neutralized with sodium bicarbonate and extracted with chloroform (250 ml×2). The chloroform layer was dried over anhydrous sodium sulfate and concentrated to 50 ml under reduced pressure, and then 200 ml of hexane was added. Deposited crystals were collected by filtration and dried.

Pale yellow crystals 7 g (Yield 38.5%), Melting point 120° C.

(b) Synthesis of (1)

First, 3.8 g of cycloheptimidazole was added to 20 ml of anisole, 7.2 g of methyl trifluoromethanesulfonate was added dropwise and the mixture was stirred at room temperature for 30 minutes. Precipitated oily matter was taken out by decantation. The whole oily matter and 5.1 g of 3-ethyl-2-methylbenzothiazolium p-toluenesulfonate were added to 50 ml of acetonitrile, and 4 ml of triethylamine was further added. The mixture was refluxed with heating for one hour and solvent was distilled away. The resulting crude product was purified twice by silica gel column chromatography using a mixed solvent of methanol/chloroform=¼ as a developing solvent. Then, 50 ml of methanol was added to the resulting crystals to dissolve it, and a solution of 1.5 g of sodium iodide in 5 ml of methanol was added. After being allowed to stand for a while, deposited crystals were collected by filtration, washed with methanol and dried.

Red crystals 0.5 g (Yield 3.8%), Melting point 288° to 290° C., λmax=550 nm (ε=5.98×10⁴) (methanol).

SYNTHETIC EXAMPLE 11: SYNTHESIS OF (2)
(A synthetic method different from Synthetic example 1)

Synthesis of (2) is stated below in turn from synthesis of the starting substance of the dye.

(a) Synthesis of 2-methoxy-5-methyl-2,4,6-cycloheptatrien-1-one

2-Hydroxy-5-methyl-2,4,6-cycloheptatrien-1-one (223 g) as obtained by the method disclosed in *Bulletin of the Chemical Society of Japan*, vol. 32, pages 493 to 496 (1959) and 340 g of potassium carbonate were added to 1.3 l of acetone containing 10% water, 310 g of dimethyl sulfate was added thereto, and the mixture was refluxed with heating for 7 hours. After being allowed to stand overnight, deposited inorganic matters were filtered out and acetone in the filtrate was distilled away under reduced pressure. Then, 1 l of water was added to the resulting concentrate, and extracted with chloroform (0.25 l×4).

The chloroform layer was dried over anhydrous sodium sulfate, evaporated to distill away the solvent and distilled under reduced pressure (130° C./0.5 mmHg).

Colorless liquid 224 g (Yield 91%).

(b) Synthesis of 2-mercapto-6-methylcycloheptimidazole

2-Methoxy-5-methyl-2,4,6-cycloheptatrien-1-one (165 g) and 84 g of thiourea were added to 255 g of a 28% sodium methoxide methanol solution, and stirred at room temperature for 30 minutes. Then, 600 ml of methanol was added and acetic acid was added until the pH of the solution becomes around 5. Deposited crystals were collected by filtration, throughly washed with methanol and dried.

Yellow crystals 145.4 g (Yield 75%), Melting point 300° C. or more.

(c) Synthesis of 6-methyl-2-methylthiocycloheptimidazole

First, 38 g of potassium hydroxide was dissolved in 800 ml of methanol, 108.5 g of 2-mercapto-6-methylcycloheptimidazole was added, and the mixture was stirred with heating to the inner temperature of about 45° C. Then, 131.2 g of dimethyl sulfate was added dropwise thereto and stirred with heating to the inner temperature of about 45° C. for one hour. After the solvent was distilled away in some extent under reduced pressure, 1 l of water was added and extracted with chloroform (0.5 l×2). The chloroform layer was dried over anhydrous sodium sulfate and evaporated to 200 ml under reduced pressure to distil away the solvent. With the addition of 1 l of hexane, crystals were deposited, and they were collected by filtration and dried.

Colorless crystals 99.6 g (Yield 85.0%), Melting point 110° to 111° C.

(d) Synthesis of 3,6-dimethyl-2-methylthiocycloheptimidazoliumtrifluoromethanesulfonate 6-Methyl-2-methylthiocycloheptimidazole (27 g) was added to 100 ml of anisole and stirred under ice cooling. Then, 28 g of methyl trifluoromethanesulfonate was added dropwise thereto, and stirred under ice cooling. The mixture was further stirred at room temperature for one hour, 200 ml of ethyl acetate was added, and deposited crystals were collected by filtration and dried.

Colorless crystals 40.3 g (Yield 80%), Melting point 175° to 177° C.

(e) Synthesis of (2)

3,6-Dimethyl-2-methylthiocycloheptimidazolium trifluoromethanesulfonate (3 g) and 3.4 g of 3-ethyl-2-ethylthiobenzothiazolium p-toluenesulfonate were added to 50 ml of acetonitrile, 2.4 ml of triethylamine was added thereto, and the mixture was stirred with heating to the inner temperature of 45° C. for one hour. After the reaction, 200 ml of ethyl acetate was added and deposited crystals were collected by filtration. The crystals were added to 100 ml of methanol and heated to dissolve it, and the insoluble matters were filtered out in a hot state. A solution of 1.5 g of sodium iodide in 10 ml of methanol was added to the filtrate, and allowed to stand. Deposited crystals were collected by filtration, successively washed with methanol and water, and dried.

Purple crystals 1.5 g (Yield 35.9%), Melting point 260° to 264° C.

SYNTHETIC EXAMPLE 12: SYNTHESIS OF (7)
(A synthetic method different from Synthetic example 2)

3,6-Dimethyl-2-methylthiocycloheptimidazolium trifluoromethanesulfonate (3g) as synthesized in Synthetic example 1 (d) and 3.3 g of 3-ethyl-2-ethylthiobenzoxazolium p-toluenesulfonate were added to 50 ml of acetonitrile, 2.4 ml of triethylamine was added thereto, and the mixture was stirred with heating to the inner temperature of 40° C. for one hour. After the reaction, 200 ml of ethyl acetate was added and deposited crystals were collected by filtration. The crystals were added to 150 ml of methanol and dissolved therein with heating, and the insoluble matters were filtered out in a hot state. A solution of 1.5 g of sodium iodide in 10 ml of methanol was added to the filtrate and allowed to cool. Deposited crystals were collected by filtration, successively washed with methanol and water, and dried.

Purple crystals 2.4 g (Yield 59%), Melting point 300° C. or more.

SYNTHETIC EXAMPLE 13: SYNTHESIS OF (10)

3,6-Dimethyl-2-methylthiocycloheptimidazolium trifluoromethanesulfonate (3 g) as synthesized in Synthetic example 11 (d) and 5 g of 2-(2-acetanilidovinyl)-3-ethylbenzothiazolium p-toluenesulfonate were added to 50 ml of methanol, 2.4 ml of triethylamine was further added, and the mixture was stirred at room temperature for 2 hours. A solution of 1 g of sodium iodide in 10 ml of methanol was added thereto, and stirred for a while to deposit crystals.

The crystals were collected by filtration, added to 200 ml of methanol and dissolved therein under reflux with heating. The resulting insoluble matters were filtered out in a hot state, and the filtrate was allowed to cool. Deposited crystals were collected by filtration, washed with methanol and dried.

Purple crystals 2.5 g (Yield 56.8%), Melting point 215° to 216° C., λmax=672 nm (ε=1.02×10⁵) (methanol).

SYNTHETIC EXAMPLE 14: SYNTHESIS OF (60)

3,6-Dimethyl-2-methylthiocycloheptimidazolium trifluoromethanesulfonate (3 g) as synthesized in Synthetic example 11 (d) and 3.1 g of 5-(acetanilidomethylidene)-3-ethylrhodanine were added to 100 ml of methanol, 2.4 ml of triethylamine was further added, and the mixture was stirred at room temperature for one hour.

Deposited crystals were collected by filtration, 200 ml of methanol was added to them, and the mixture was refluxed with heating to dissolve them. The insoluble matters were filtered out and the filtrate was allowed to cool. Deposited crystals were collected by filtration, washed with methanol and dried.

Purple crystals 2.1 g (Yield 66.0%), Melting point 151° to 152° C., λmax=621 nm (ε=5.20×10$^4$) (methanol).

SYNTHETIC EXAMPLE 15: SYNTHESIS OF (10)
(A synthetic method different from Synthetic example 13)

Synthesis of (10) is stated below in turn from synthesis of the starting substance of the dye.

(a) Synthesis of 6-(2-acetanilidovinyl)-3-methyl-2-methylthiocycloheptimidazolium trifluoromethanesulfonate 3,6-Dimethyl-2-methylthiocycloheptimidazolium trifluoromethanesulfonate (10 g) as synthesized in Synthetic example 11 (d) and 8.3 g of N,N'-diphenylformamidine were added to 150 ml of acetic anhydride, and stirred with heating to the inner temperature of about 90° C. for one hour. After being allowed to cool, 150 ml of ethyl acetate was added thereto, and deposited crystals were collected by filtration and dried.

Yellow crystals 12 g (Yield 85.1%), Melting point 162° to 163° C.

(b) Synthesis of (10)

6-(2-acetanilidovinyl)-3-methyl-2-methylthiocycloheptimidazolium trifluoromethanesulfonate (4 g) and 2.5 g of 3-ethyl-2-methylbenzothiazolium p-toluenesulfonate were added to 50 ml of methanol, 2.2 ml of triethylamine was added and the mixture was stirred at room temperature for one hour. Post-treatment was conducted in the same manner as in Synthetic example 13.

Purple crystals 2.7 g (Yield 73.0%), Melting point 215° to 216° C.

SYNTHETIC EXAMPLE 16: SYNTHESIS OF (60)
(A synthetic method different from Synthetic example 14)

6-(2-Acetanilidovinyl)-3-methylthiocycloheptimidazolium trifluoromethanesulfonate (4 g) as synthesized in Synthetic example 15 (a) and 1.16 g of 3-ethylrhodanine were added to 100 ml of methanol, 2.2 ml of triethylamine was further added, and the mixture was stirred at room temperature for one hour. Thereafter, treatments similar to those in Synthetic example 14 were conducted.

Purple crystals 2.3 g (Yield 85.2%), Melting point 151° to 152° C.

SYNTHETIC EXAMPLE 17: SYNTHESIS OF (45)

3,6-Dimethyl-2-methylthiocycloheptimidazolium trifluoromethanesulfonate (5 g), 1.66 g of N,N'-diphenylformamidine and 2 ml of acetic anhydride were added to 100 ml of methanol, 3.9 ml of triethylamine was further added, and the mixture was stirred at room temperature for one hour. A solution of 1 g of sodium iodide in 10 ml of methanol was added to the reaction solution. After stirring for a while, deposited crystals were collected by filtration and dissolved in 100 ml of methanol through reflux with heating, and the insoluble matters were filtered out in a hot state.

The filtrate was allowed to cool, and deposited crystals were collected by filtration, washed with methanol and dried.

Purple crystals 2.1 g (Yield 54.5%), Melting point 140° to 141° C., λmax=825 nm (ε=1.21×10$^5$) (methanol).

(Structure determination)

All the dyes of the present invention as synthesized in Synthetic examples 1 to 17 exhibit molecular ion (parent) peak in mass spectra. Further, coincides of elementary analyses were observed.

The following are $^1$H-Nmr data of some dyes. All the measurements were conducted using 400 MHz$^1$H-Nmr and DMSO-d$^6$ solvent.

(1): Measuring temperature 373K

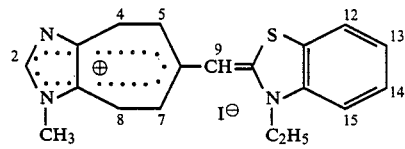

δ ppm, JinHz:
1.45 (3 H, t, J=8, N—CH$_2$—C$\underline{H_3}$)
3.93 (3 H, s, N—CH$_3$)
4.67 (2 H, q, J=8, N—C$\underline{H_2}$CH$_3$)
6.90 (1 H, S, H-9)
7.55–7.66 (4 H, m, H-13 (or 14), 3 H among H-4, 5, 7, 8)
7.73 (1 H, td, J=8, 0.5, H-14 (or 13))
7.83 (1 H, dd, J=12, 1 H among H-4, 5, 7, 8)
7.95 (1 H, d, J=8, H-15),
8.17 (1 H, d, J=8, H-12),
8.33 (1 H, s, H-2).

(2): Measuring temperature 333K

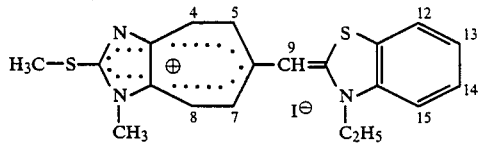

δ ppm, JinHz:
1.41 (3 H, t, J=8, N—CH$_2$C$\underline{H_3}$)
2.79 (3 H, s, S—CH$_3$)
3.78 (3 H, s, N—C$\underline{H_3}$)
4.62 (2 H, q, J=8, N—C$\underline{H_2}$CH$_3$)
6.88 (1 H, S, H-9)
7.54 (1 H, t, J=8, H-14 (or 13))
7.67 (2 H, d, J=12, H-5, 7 (or 4,8))
7.69 (1 H, t, J=8, H-13 (or 14))
7.88 (2 H, d, J=12, H-4, 8 (or 5,7))
7.90 (1 H, d, J=8, H-15)
8.14 (1 H, d, J=8, H-12).

(7): Measuring temperature 373K

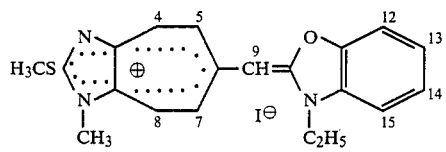

δppm, JinHz:
1.44 (3 H, t, J=7, N—CH2CH3)
2.79 (3 H, s, S—CH3)
3.79 (3 H, s, N—CH3)
4.38 (2 H, q, J=7, N—CH2CH3)
6.22 (1 H, S, H-9)
7.48 (1 H, td, J=8, 1, H-14 (or 13))
7.54 (1 H, td, J=8, 1, H-13 (or 14))
7.73 (1 H, dd, J=8, 1, H-15)
7.79 (1 H, dd, J=8, 1, H-12)
7.85–7.89 (2 H, m, H-5, 7 (or 4, 8))
7.91–8.02 (2 H, bm, H-4, 8 (or 5, 7)).

(49): Measuring temperature 373K

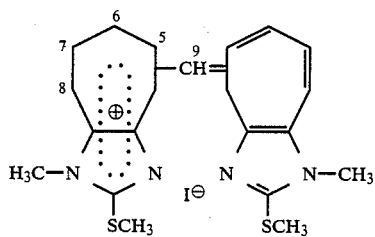

δppm, JinHz:
2.84 (6 H, s, —SCH3)
3.82 (6 H, s, N—CH3)
7.36 (2 H, t, J=12, H-7)
7.47 (2 H, t, J=12, H-6)
7.84 (2 H, d, J=12, H-5)
8.22 (2 H, d, J=12, H-8)
8.44 (1 H, S, H-9).

Further, Nucleus Overhauser Effect (NOE) was observed between N—CH3 and H-8.

(50): Measuring temperature 373K

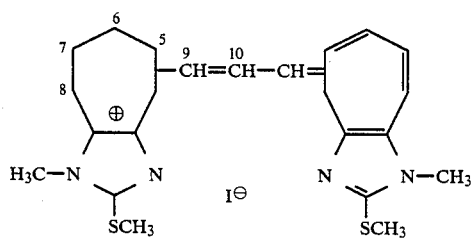

δppm, JinHz:
2.88 (6 H, s, —SCH3)
3.77 (6 H, s, N—CH3)
7.19 (2 H, t, J=12, H-7)
7.27 (2 H, t, J=12, H-6)
7.33 (2 H, d, J=13, H-9)
7.66 (2 H, d, J=12, H-5)
8.18 (2 H, d, J=12, H-8)
9.10 (1 H, bt, J=13, H-10).

(58): Measuring temperature 323K

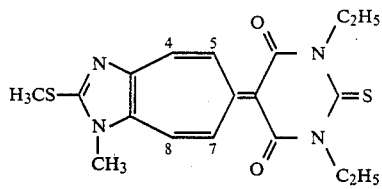

δppm, JinHz:
1.20 (6 H, t, J=8, N—CH2CH3)
2.86 (3 H, s, —SCH3)
3.88 (3 H, s, N—CH3)
4.48 (4 H, q, J=8, N—CH2CH3)
8.43 (1 H, d, J=12, H-5 or 7 (or 4 or 8))
8.46 (1 H, d, J=12, H-5 or 7 (or 4 or 8))
9.17 (1 H, d, J=12, H-4 or 8 (or 5 or 7))
9.20 (1 H, d, J=12, H-4 or 8 (or 5 or 7)).

(59): Measuring temperature 323K

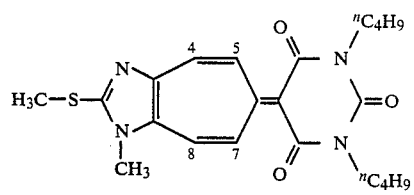

δppm, JinHz:
0.89 (6 H, t, J=8, —N(CH2)3CH3)
1.28 (4 H, qt, J=8, NCH2CH2CH3)
1.52 (4 H, tt, J=8, NCH2CH2CH2CH3)
2.82 (3 H, s, —SCH3)
3.83 (3 H, s, —NCH3)
3.83 (4 H, t, J=8, NCH2CH2CH2CH3)
8.23 (1 H, d, J=12, H-5 or 7 (or 4 or 8))
8.25 (1 H, d, J=12, H-5 or 7 (or 4 or 8))
9.18 (1 H, d, J=12, H-4 or 8 (or 5 or 7))
9.22 (1 H, d, J=12, H-4 or 8 (or 5 or 7)).

(77): Measuring temperature 298K

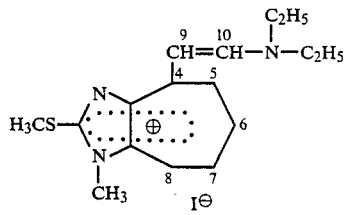

δppm, JinHz:
1.23 (3 H, t, J=8, N—CH2—CH3)
1.26 (3 H, t, J=8, N—CH2—CH3)
2.77 (3 H, s, S—CH3)
3.60 (2 H, q, J=8, N—CH2CH3)
3.65 (2 H, q, N—CH2CH3)
3.73 (3 H, s, N—CH3)
6.07 (1 H, d, J=13, H-10)
7.36 (1 H, t, J=12, H-7)
7.67 (1 H, d, J=12, H-5)
7.75 (1 H, t, J=12, H-6)
7.91 (1 H, d, J=12, H-8)
8.50 (1 H, t, J=13, H-9).

Methine dyes used in optical recording media of the present invention may be used alone or in combination of 2 or more, or may be used together with dyes other than methine dyes of the present invention. Further, it is also effective to use various antioxidants or singlet oxygen quenchers toghther therewith for enhancement of reading durability. Further, various resins may also be used together.

It is also possible to increase reading durability by forming chelate compounds with methine dyes of the invention by addition of transition metal ions. This method is remarkably effective when methine dyes of the invention have nitrogen-containing heterocycles.

Various quenchers may be used in the invention, but preferred ones are transition metal complexes which lower deterioration by reproduction and have good compatibility with dyes. Preferred center metals are Ni, Co, Cu, Pd, Pt and the like.

Examples of novel quenchers which may be used in the invention include quenchers represented by the formulae (XXI) and (XXII):

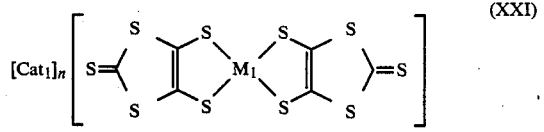
(XXI)

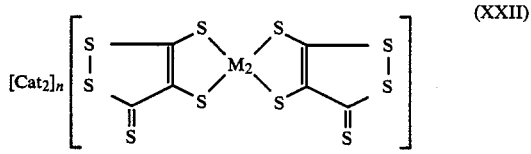
(XXII)

wherein [Cat$_1$] and [Cat$_2$] each represent a cation necessary for making each compound neutral, M$_1$ and M$_2$ each represent nickel, copper, cobalt, palladium or platinum, and n represents 1 to 2.

Examples of an inorganic cation in the cation represented by [Cat$_1$] or [Cat$_2$] in the aforesaid general formula (XXI) or (XXII) include alkali metal ions such as Li$^+$, Na$^+$ and K$^+$, alkaline earth metal ions such as Mg$^{2+}$, Ca$^{2+}$ and Ba$^{2+}$.

Further, examples of an organic cation therein include quaternary ammonium ions and quaternary phosphonium ions.

Preferred cations among the above cations [Cat$_1$] and [Cat$_2$] are those represented by the following general formula (XXIII-a), (XXIII-b), (XXIII-c), (XXIII-d) or (XXIII-e):

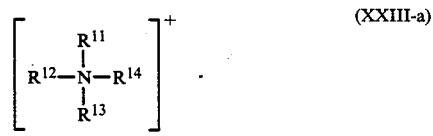
(XXIII-a)

(XXIII-b)

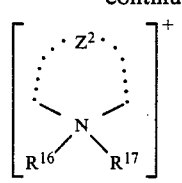
(XXIII-c)

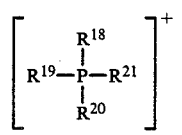
(XXIII-d)

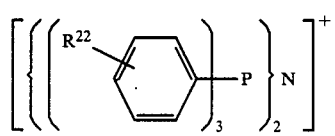
(XXIII-e)

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ each represent a substituted or unsubstituted alkyl group having 1 to 20 carbon atoms, or a substituted or unsubstituted aryl group having 6 to 14 carbon atoms, and $Z^1$ and $Z^2$ each represent a nonmetal atomic group which forms a 5-membered or 6-membered ring together with a nitrogen atom or a phosphorus atom in each formula.

The above substituted or unsubstituted alkyl group having 1 to 20 carbon atoms includes, for example a methyl group, an ethyl group, a n-butyl group, an iso-amyl group, a n-dodecyl group and n-octadecyl group. The aryl group having 6 to 14 carbon atoms include, for example a phenyl group, a tolyl group and an α-naphtyl group.

These alkyl groups and aryl groups may respectively be substituted with a cyano group, a hydroxyl group, an alkyl group having 1 to 20 carbon atoms (e.g., a methyl group, an ethyl group, an n-butyl group or an n-octyl group), an aryl group having 6 to 14 carbon atoms (e.g., a phenyl group, a tolyl group or an α-naphthyl group), an acyloxy group having 2 to 20 carbon atoms (e.g., an acetoxy group, a benzoyl group or p-methoxybenzoyloxy group), an alkoxy group having 1 to 6 carbon atoms (e.g., a methoxy group, an ethoxy group, a propoxy group or a butoxy group), an aryloxy group (e.g., a phenoxy group or a tolyloxy group), an aralkyl group (e.g., a benzyl group, a phenethyl group or an anisyl group), an alkoxycarbonyl group (e.g., a methoxycarbonyl group, an ethoxycarbonyl group or an n-butoxycarbonyl group), an aryloxycarbonyl group (e.g., a phenoxycarbonyl group or a tolyloxycarbonyl group), an acyl group (e.g., an acetyl group or a benzoyl group), an acylamino group (e.g., an acetylamino group or a benzoylamino group), a substituted or unsubstituted carbamoyl group (e.g., an N-ethylcarbamoyl group or an N-phenylcarbamoyl group), an alkylsulfonylamino group (e.g., a methylsulfonylamino group), an arylsulfonylamino group (e.g., a phenylsulfonylamino group), a substituted or unsubstituted sulfamoyl group (e.g., an N-ethylsulfamoyl group or an N-phenylsulfamoyl group), an alkyl- or arylsulfonyl group (e.g., a mesyl group or a tosyl group) or the like.

$Z^1$ and $Z^2$ each represent a nonmetal atomic group necessary for forming a 5-membered ring or a 6-membered ring as aforesaid. The 5-membered ring or 6-membered ring may include a pyridine ring, an imidazole ring, a pyrrole ring, a 2-pyrroline ring, a pyrrolidine ring, a piperidine ring, a pyrazole ring, a pyrazoline ring, an imidazoline ring and the like.

Cations represented by the general formula (XXIII-b) may include, for example, a dodecylpyridinium group, a hexadecylpyridinium group and a dodecylimidazolium group. Cations represented by the general formula (XXIII-c) may include, for example, an N-ethyl-N-hexadecylpiperidinium group, an N-ethyl-N-dodecylpyrazolidinium group.

Cations preferably used in the present invention among cations represented by the above general formulae (XXIII-a), (XXIII-b), (XXIII-c), (XXIII-d) and (XIII-e) are (XXIII-a), (XXIII-b), (XXIII-d) and (XXIII-e) in view of availability of the raw materials and preparation cost.

The kind of these cations [$Cat_1$] and [$Cat_2$] has an influence on the solubilities of the compounds represented by the aforesaid general formula (XXI) or (XXII) in organic solvents.

In general, when substituents linking to the quaternary hereto atom are alkyl groups, solubility of the compound increases as the chain lengths of the alkyl groups become longer. This tendency is remarkable in case of tetraalkyl substituted ammonium or tetraalkyl substituted phosphonium, and cations having a total carbon number of 17 or more in case of ammonium cations and cations having a total carbon number of 4 or more in case of phosphonium cations each bestow high solubilities on the compounds.

Enumeration of $M_1$ or $M_2$ in the compounds represented by the aforesaid general formula (XXI) or (XXII) in order of preference is nickel, cobalt, copper, palladium and platinum.

The metal complexes of the general formula (XXI) or (XXII) have stereostructures of plane four coordination. Though it cannot be definitely determined whether the thioketone groups in the compounds of the general formula (XXII) exist symmetrically or unsymmetrically in relation to the center metal, the thioketone groups are represented for convenience's sake as in the general formula (XXII) in the present specification.

The compounds represented by the aforesaid general formula (XXI) or (XXII) may be synthesized as follows.

A compound of the general formula (XXI) (n=2): Disodium 1,3-dithiol-2-thione-4,5-dithiolate obtained by reacting carbon disulfide with sodium is converted to a zinc complex, and benzoyl chloride is reacted with the complex to form a bisbenzoylthio compound. After decomposition with an alkali, the bisbenzoylthio compound is reacted with a metal salt to obtain the captioned compound.

Further, a compound of the general formula (XXI) (n=1) may be obtained by oxidizing a complex obtained as above-described (n=2) with a proper oxidizing agent.

A compound of the general formula (XXII) (n=2): First, disodium 1,3-dithiol-2-thione-4,5-dithiolate obtained by reaction of carbon disulfide with sodium is heated to above 130° C. to isomerize it to disodium 1,2-dithiol-3-thione-4,5-dithiolate. Then, this dithiolate is converted to a zinc complex, and benzoyl chloride is reacted with the zinc complex to form a bisbenzoylthio compound, which is the decomposed with an alkali and reacted with a metal salt to obtain the captioned compound.

A compound of the general formula (XXII) (n=1) may be obtained by oxidizing a complex obtained as above-described (n=2) with a proper oxidizing agent.

Further, the 1,3-dithiol-2-thione-4,5-dithiolate anion which is an intermediate for obtaining a compound of the general formula (XXI) or (XXII) may also be obtained by electrochemical reduction besides the Na-reduction method described above.

Preferred compounds among those represented by the aforesaid general formulae (XXI) are illustrated as follows.

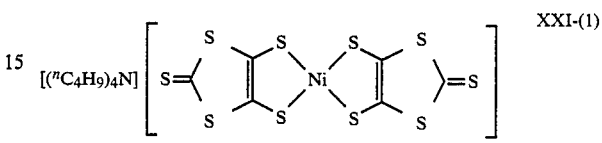

XXI-(1)

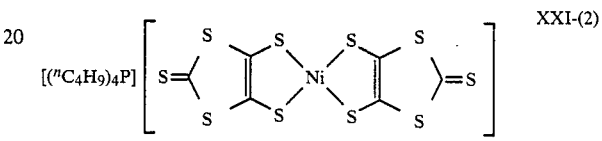

XXI-(2)

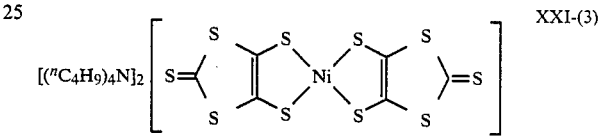

XXI-(3)

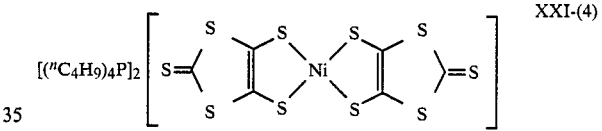

XXI-(4)

Synthetic examples of compounds represented by the general formula (XXI) is described as follows.

SYNTHETIC EXAMPLE 8:

Synthesis of exemplified compound (XXI-4)

(1-1) Synthesis of bis(tetraethylammonium)bis(1,3-dithiol-2-thione-4,5-dithiolato)zinc complex All reaction procedures were conducted under an argon atmosphere. 23 g of sodium was cut into small pieces and dispersed in 180 ml of carbon disulfide, followed by dropwise addition in a slow speed of 200 ml of dimethylformamide thereto with stirring. During the dropwise addition, caution should be given so that the mixture does not rapidly generate heat. After the dropwise addition of dimethylformaminde, the mixture was gently heated with caution and refluxed for 24 hours. After completion of the reaction the unreacted sodium was removed by filtration. Then, 50 ml of ethanol was added to the filtrate, and the mixture was stirred at room temperature for 2 hours. Carbon disulfide was distilled away from this solution at room temperature under reduced pressure. Then, 300 ml of water was slowly added dropwise thereto and the resulting solution was filtered.

Separately in advance, 20 g of zinc chloride was dissolved in 500 ml of methanol and 500 ml of concentrated ammonia water was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was recovered by filtration and air-dried to obtain the captioned zinc complex.

(1-2) Synthesis of 4,5-bis(benzoylthio)-1,3-dithiol-2-thione 22 g of the zinc complex obtained in (1-1) was dissolved in 500 ml of acetone and filtered. 150 ml of benzoyl chloride was added to the filtrate with stirring to form immediately a yellow precipitate. The precipitate was recovered by filtration, washed with water and air-dried to obtain 16 g of the captioned compound.

(1-3) Synthesis of exemplified compound (XXI-4)

9.2 g of the bis(benzoylthio) compound obtained in (1-2) was dissolved in 50 ml of methanol. Then, 6.3 g of a 28% methanol solution of sodium methoxide was added thereto, followed by stirring for 10 minutes. To this solution was added a solution of 2.4 g of nickel chloride hexahydrate in 50 ml of methanol, and the mixture was stirred at room temperature for 30 minutes. To the resulting solution was added a solution of 8.5 g of tetrabutylphosphonium bormide in 100 ml of methanol to form immediately a black precipitate. The mixture was stirred for additional 20 minutes and filtered. The solid was washed with acetone, air-dried and recrylstallized from acetone-isopropyl alcohol to obtain the captioned compound. Yield 3.8 g.

SYNTHETIC EXAMPLE 9:

Synthesis of exemplified compound (XXI-2)

1 g of the nickel complex obtained in (1-3) was dissolved in 60 ml of acetone, and 30 ml of acetic acid was added thereto. The mixture was stirred for 3 hours and the solvent was distilled away to form black crystals, which was then recrystallized from acetone-methanol to obtain the desired exemplified compound (XXI-2). Yield 0.4 g, M.P. 185° C., λmax.: 1125 nm, εmax.: $2.51 \times 10^4$ (in $CH_2Cl_2$)

Examples of known quenchers which may be used in the invention include the following compounds disclosed in J.P. KOKAI No. 59-178295.

(i) Bisdithio-α-diketone series

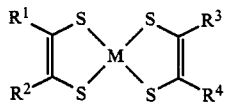

wherein $R^1$ to $R^4$ each represent an alkyl group or an aryl group, and M represents a divalent transition metal atom.

(ii) Bisphenyldithiol series

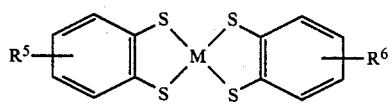

wherein $R^5$ and $R^6$ each represent an alkyl group or a halogen atom, and M represents a divalent transition metal atom.

(iii) Acetylacetonate cholate series
(iv) Dithiocarbamic acid chelate series
(v) Bisphenylthiol series
(vi) Thiocatechol chelate series
(vii) Salicylaldehyde oxime series
(viii) Thiobisphenolate chelate series
(ix) Phosphonous acid chelate series
(x) Benzoate series
(xi) Hindered amine series
(xii) Transition metal salts Besides the above compounds, aminium series or diimonium series compounds represented by the following formula may also be used in the invention as known quenchers:

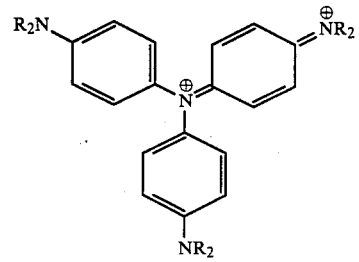

wherein R represents an alkyl group or an aryl group. Specific examples thereof include IRG-002, IRG-003, IRG-022 and IRG-033 each manufactured by NIPPON KAYAKU CO., LTD.

A linkage compound of a cation of methine dye(s) of the present invention to an anion of a quencher may also be used in the invention.

A quencher is generally used in an amount of 0.05 to 12 moles, preferably 0.1 to 1.2 moles per 1 mole of methine dye(s) of the invention.

Though a quencher is preferably contained in the dye film recording layer, it may be contained in a layer different from the recording layer. It is possible to provide a subbing layer on the support, a protective layer on the recording layer, and/or a reflective layer on the support or on the recording layer in the optical recording medium of the invention.

Known supports may arbitrary be used as a support. Typical examples thereof are glass and plastics such as acryls, polycarbonates, polysulfones, polyimides, amorphous polyolefins, epoxy resins, polyesters and the like. The support may be used in various shapes such as disc-like, card-like, sheet-like and roll film-like shapes.

A groove may be formed on the glass or plastic support in order to make tracking easy during recording. Further, a subbing layer of a plastic binder, or an inorganic oxide, an inorganic sulfide or the like may be provided on the glass or plastic support. A subbing layer having a thermal conductivity lower than the support is preferable. Further, it is also possible to make two recording madia facing with each other so that both recording layers are inside, namely to make two recording media so-called air sandwich structure.

The recording layer in the present invention may be formed, for example, by dissolving a dye of the invention and a quencher in an organic solvent (for example, methanol, ethanol, isopropyl alcohol, a fluorinated alcohol such as 2,2,3,3-tetrafluoropropanol, dichloromethane, dichloroethane or acetone), and, if necessary, adding a proper binder (for example, PVA, PVP, polyvinyl butyral, polycarbonate, nitrocellulose, polyvinyl formal, methyl vinyl ether, chlorinated paraffin, maleic anhydride copolymer, styrenebutadiene copolymer or xylene series resin), and applying the solution (for example by spin coating) onto a support. The recording layer may also be formed by co-depositing a methine dye of the invention and a quencher on a support, or by vacuum-depositing a methine dye of the invention and then applying a quencher. When a binder is used, it is preferable to use it in an amount of 0.01 to 2 times the weight of the dye. Further, it is also possible to form a thin film according to Langmuir-Blodgett's technique using a dye.

It is possible to provide one or more of the recording layers in the present invention.

An antioxidant or a fading inhibitor may be contained in the recording layer or a layer adjacent thereto in order to inhibit deterioration of the dye.

Film thickness of the recording layer is usually in the range of 0.01 to 2 μm, preferably in the range of 0.02 to 0.8 μm. In case of reflection reading, it is particularly preferable that the thickness is odd number times the ¼ of the laser wave length used for reading.

When a layer for reflecting semiconductor laser, He-Ne laser or the like is provided, the optical recording medium of the present invention may be made either by providing a reflecting layer on a support and then providing a recording layer on the reflecting layer in such a manner as aforementioned, or by providing a recording layer on a support and then providing a reflecting layer thereon.

The reflecting layer may be provided in such a manner as described below besides a sputtering method, an ion plating method or the like.

For example, a solution which is prepared by dissolving a metal salt or a metal complex salt in a water soluble resin (PVP, PVA or the like) and further adding a reducing agent thereto is applied onto a support and the resulting support is dried with heating at 50° to 150° C., preferably 60° to 100° C., whereby a reflecting layer is provided thereon.

The metal salt or the metal complex salt is used in a weight ratio of 0.1 to 10, preferably 0.5 to 1.5 based on the resin. Further, as for the thickness of the recording layer, it is proper that the thickness of the metal particle reflecting layer is in the range of 0.01 to 0.1 μm and that of the light absorption layer is in the range of 0.01 to 1 μm.

Usable metal salts and metal complex salts include silver nitrate, potassium silver cyanide, potassium gold cyanide, silver ammine complex, silver cyan complex, gold salt or gold cyan complex and the like. Usable reducing agents include formalin, tartaric acid, a tartrate, a hypophosphite, sodium borohydride, dimethylamine borane and the like. The reducing agent may be used in the range of 0.2 to 10 moles, preferably 0.5 to 4 moles per 1 mole of the metal salt or the metal complex salt.

In the optical recording medium of the present invention, recording of information is conducted by applying a spot-like high energy beam such as laser (for example, semiconductor laser and He-Ne laser) onto the recording layer through the support or from the opposite side of the support. That is to say, light absorbed in the recording layer is converted to heat and pits are formed in the recording layer.

On the other hand, reading of information is conducted by applying a laser beam with a low power of the threshold value energy or less for recording, detecting the difference in quantity of reflected light or quantity of transmitted light between pitted areas and unpitted areas.

The present invention is further explained in detail below according to the examples.

EXAMPLE 1

A dye and a quencher, and a binder when needed, each shown in Table 2 were dissolved in a mixed solvent of methanol, methyl ethyl ketene and dichloroethane in a proper ratio. A surface-hardened polycarbonate support with a groove (1.6 μ pitch, 750Å depth) was coated with the solution to a thickness of 0.1 μm, and dried. The weight ratio of the dye and the quencher was 3:1, and in case of using a binder, the weight thereof was 1/5 of the dye.

Evaluation conditions were as follow.

| (Recording and reproduction) | |
|---|---|
| Laser | Semiconductor laser (GaAlAs) |
| Wavelength of laser | 780 nm |
| Beam diameter of laser | 1.6 μm |
| Line speed | 5 m/s |
| Recording power | 8 mW |
| Recording frequency | 2.5 MHz |
| Recording duty | 50% |
| Reproduction power | 0.4 mW |
| (Evaluation of deterioration by reproduction) | |
| Reproduction power | 1.0 mW |
| Reproduction number | $10^5$ times |
| (Evaluation of deterioration during preservation) | |
| Preservation temperature and humidity | 60° C., 90% RH |
| Preservation time | for 30 days |

TABLE 2

| Sample No. | Dye | Quencher | Binder | C/N (dB) Just after preparation | C/N (dB) Deterioration by reproduction | C/N (dB) Deterioration during preservation | Note |
|---|---|---|---|---|---|---|---|
| 1 | A | — | — | 54 | 45 | 42 | Comparative example |
| 2 | A | XXI-2 | — | 52 | 45 | 48 | Comparative example |
| 3 | A | — | Polystyrene | 50 | 46 | 42 | Comparative example |
| 4 | A | XXI-4 | Chlorinated paraffin | 52 | 46 | 48 | Comparative example |
| 5 | B | — | — | 53 | 44 | 40 | Comparative example |
| 6 | B | XXI-2 | — | 50 | 43 | 47 | Comparative example |
| 7 | B | — | Polystyrene | 50 | 44 | 43 | Comparative example |
| 8 | B | XXI-2 | Chlorinated paraffin | 51 | 44 | 48 | Comparative example |
| 9 | 16 | — | — | 55 | 50 | 49 | Present invention |
| 10 | " | XXI-2 | — | 52 | 48 | 53 | Present invention |
| 11 | " | — | Polystyrene | 51 | 48 | 48 | Present invention |
| 12 | " | XXI-4 | Nitrocellulose | 52 | 49 | 50 | Present invention |
| 13 | 21 | — | — | 55 | 51 | 50 | Present invention |
| 14 | " | XXI-2 | — | 53 | 50 | 52 | Present invention |
| 15 | 21 | — | Polystyrene | 52 | 49 | 49 | Present invention |
| 16 | " | XXI-4 | Polystyrene | 52 | 49 | 51 | Present invention |

TABLE 2-continued

| Sample No. | Dye | Quencher | Binder | C/N (dB) Just after preparation | C/N (dB) Deterioration by reproduction | C/N (dB) Deterioration during preservation | Note |
|---|---|---|---|---|---|---|---|
| 17 | 30 | — | — | 54 | 50 | 49 | Present invention |
| 18 | " | XXI-2 | — | 53 | 49 | 52 | Present invention |
| 19 | " | — | Polyethylene acrylate | 52 | 49 | 48 | Present invention |
| 20 | " | XXI-4 | Polyvinyl butyral | 52 | 49 | 51 | Present invention |
| 21 | 47 | — | — | 55 | 51 | 51 | Present invention |
| 22 | " | XXI-2 | — | 54 | 50 | 54 | Present invention |
| 23 | " | — | Polystyrene | 54 | 51 | 50 | Present invention |
| 24 | " | XXI-4 | Polyvinyl formal | 53 | 52 | 51 | Present invention |
| 25 | 50 | — | — | 54 | 50 | 51 | Present invention |
| 26 | " | Nickel acetate | — | 53 | 49 | 52 | Present invention |
| 27 | 50 | — | Polyvinyl alcohol | 53 | 49 | 50 | Present invention |
| 28 | 50 | Copper acetate | Polycarbonate | 53 | 49 | 52 | Present invention |
| 29 | 52 | — | — | 54 | 50 | 50 | Present invention |
| 30 | " | XXI-2 | — | 52 | 48 | 52 | Present invention |
| 31 | " | — | Polyethylene | 51 | 48 | 48 | Present invention |
| 32 | " | XXI-4 | Polystyrene | 51 | 48 | 50 | Present invention |
| 33 | 61 | — | — | 55 | 51 | 50 | Present invention |
| 34 | " | XXI-2 | — | 54 | 50 | 54 | Present invention |
| 35 | " | — | Polymethaacrylate | 54 | 51 | 51 | Present invention |
| 36 | " | XXI-4 | Styrene-butadiene copolymer | 53 | 50 | 53 | Present invention |
| 37 | 63 | — | — | 54 | 50 | 49 | Present invention |
| 38 | " | XXI-2 | — | 53 | 50 | 52 | Present invention |
| 39 | " | — | Nitrocellulose | 52 | 49 | 48 | Present invention |
| 40 | " | XXI-4 | Chlorinated paraffin | 52 | 49 | 51 | Present invention |

Comparative dyes

A

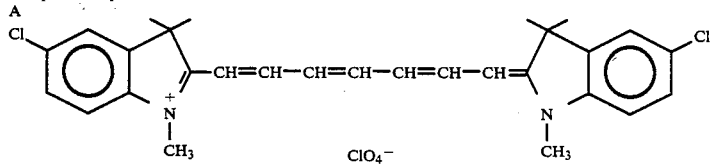

B

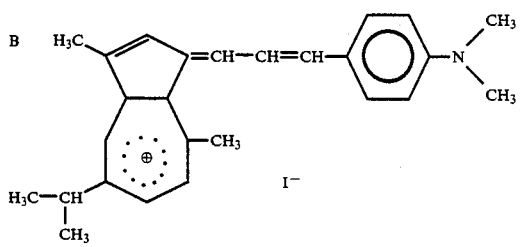

REFERENCE EXAMPLE 1

Light stability of methine dyes (2), (49) and (50) of the invention were examined.

As comparative dyes, polymethine-cyanine dyes symmetrical with respect to benzothiazole A-1, A-2, A-3, A-4 and A were used.

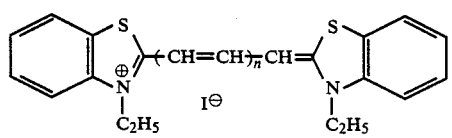

A-1 n = 0
A-2 n = 1
A-3 n = 2
A-4 n = 3

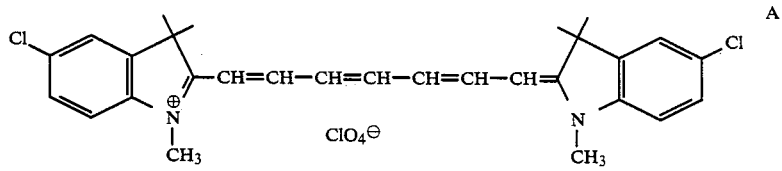

A

EXPERIMENTAL CONDITIONS

Measuring apparatus

Light irradiation: CRM-FA Xe lamp irradiation spectroscope manufactured by NIPPON BUNKO CO., LTD.

Quantitative determination: 340 type spectrophotometer manufactured by HITACHI, Ltd.

Measuring condition

Light irradiation wavelength: λmax. of each dye except (50), A-4 and A-5 where light irradiations were each conducted at 704 nm
Solvent: Methanol
Dye density: $1 \times 10^{-5}$ mol/l Data treatment E: Energy absorbed by a dye (erg/mol)
E = light energy which incomed in the cell (erg/cm$^2$) x absorption coefficient ($10^3$ cm$^2$/mol)
E½: Light energy absorbed by a dye when dye density was reduced to one-half its initial value (erg/mol)

| Light stability of dyes (2), (49) and (50) of the invention | | |
|---|---|---|
| Dye | λ max (nm) | E ½ ($\times 10^{17}$ erg/mol) |
| (2) | 574 | 319.5 |
| (49) | 674 | 155.9 |
| (50) | 774 | 173.3 |

| Light stability of comparative dyes A-1, A-2, A-3 and A-4 | | |
|---|---|---|
| Dye | λ max (nm) | E ½ ($\times 10^{17}$ erg/mol) |
| A-1 | 423 | 16.6 |
| A-2 | 555 | 67.2 |
| A-3 | 650 | 1.6 |
| A-4 | 756 | 0.1 |

| Light stability of comparative dye A | | |
|---|---|---|
| Dye | λ max (nm) | E ½ ($\times 10^{17}$ erg/mol) |
| A | 746 | 8.5 |

As is seen from the abovedescribed, dyes (2), (49) and (50) of the invention each have light stabilities much higher than those of the comparative dyes, and are excellent as dyes for optical discs.

Optical information recording media of the invention have adequate recording characteristics having high C/N, and have high stabilities against long-term preservation or against long-time reading.

What is claimed is:

1. An optical information recording medium for carrying out recording and reproduction with laser beams which comprises a support having carried thereon at least one methine dye which comprises an azulene nucleus, at least one of the two carbon atoms at the 1 and 3 positions of which is replaced by a chalcogen atom or a nitrogen atom, and further whose 7-membered ring part is substituted with a methine bond having at the terminal an auxochrome which forms a conjugated resonance chromophore together with a 10 π electron system of the nucleus.

2. The optical information recording medium of claim 1, wherein when both carbon atoms at the 1- and 3-positions of the azulene nucleus are replaced by a chalcogen atom or a nitrogen atom, at least one of the replacing atoms is a nitrogen atom.

3. The optical information recording medium of claim 1, wherein the methine dye is represented by the following general formula (I):

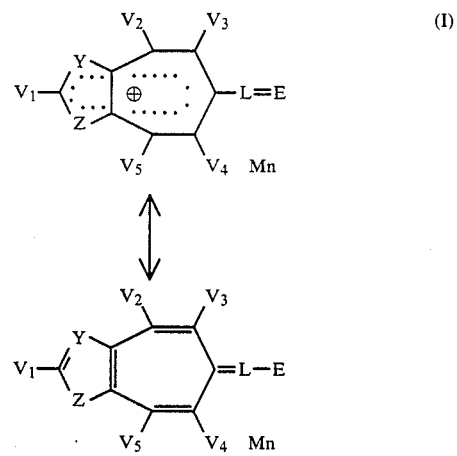

wherein
E represents an auxochrome; L represents a methine bond; $V_1$, $V_2$, $V_3$, $V_4$ and $V_5$ independently represent hydrogen atoms, halogen atoms, substituted or unsubstituted alkyl groups, acyl groups, acyloxy groups, substituted or unsubstituted alkoxycarbonyl groups, substituted or unsubstituted carbamoyl groups, substituted or unsubstituted sulfamoyl groups, carboxyl groups, cyano groups, hydroxyl groups, amino groups, acylamino groups, substituted or unsubstituted alkoxy groups, alkylthio groups, alkylsulfonyl groups, sulfonic acid groups, or aryl groups, or alternatively two of $V_1$ to $V_5$ linking to adjacent carbon atoms may combine to form a condensed ring;

Y represents

(wherein V has the same meaning as $V_1$, $V_2$, $V_3$, $V_4$ and $V_5$) or a nitrogen atom, Z represents

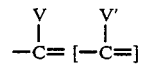

(wherein V has the same meaning as $V_1$, $V_2$, $V_3$, $V_4$ and $V_5$), a chalcogen atom or a nitrogen atom, provided that Y and Z do not represent carbon atoms at the same time;

M represents a counter ion for charge balance, m is a number of 0 or more necessary for the balance of charge; and bonding position of a methine bond L is representatively expressed as the 6-position in the formula (I), but may also be expressed as the 4-, 5-, 7- or 8-position.

4. The optical information recording medium of claim 3, wherein Z represents

and $R_1$ represents a hydrogen atom, a substituted or unsubstituted alkyl group, a substituted or unsubstituted aryl group, or a heterocyclic ring group.

5. The optical information recording medium of claim 4, wherein $R_1$ is an unsubstituted alkyl group having 18 or less carbon atoms, or a sulfoalkyl group.

6. The optical information recording medium of claim 3, wherein the methine dye is represented by one of the following formula (II) to (IX):

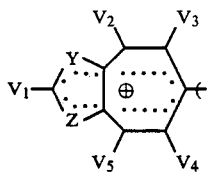

General formula (II)

wherein $V_1$ to $V_5$, Y, Z, M and m have the same meanings as those in the general formula (I); position of the methine bond may be any of the 4-, 5-, 6-, 7- and 8-positions, as is in the general formula (I);

$Q_1$ represents an atomic group necessary for forming a 5- or 6-membered nitrogen-containing ring; $L_1$, $L_2$, $L_3$, $L_4$ and $L_5$ each represent methine groups which may optionally be substituted;

$R_2$ represents a substituted or unsubstituted alkyl group; l represents an integer of 0 to 3; and $n_1$ represents 0 or 1;

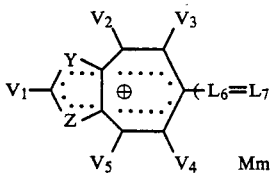

General formula (III)

wherein $V_1$ to $V_5$, Y, Z, M and m have the same meanings as those in the general formula (I); position of the methine bond may be any of the 4-, 5-, 6-, 7- and 8-positions, as is in the general formula (I);

$Q_2$ represents an atomic group necessary for forming a 5- or 6-membered nitrogen-containing ring; $L_6$, $L_7$, $L_8$, $L_9$ and $L_{10}$ have the same meanings with $L_1$, $L_2$, $L_3$, $L_4$ and $L_5$;

$R_3$ represents a substituted or unsubstituted alkyl group;

$l_2$ represents an integer of 0 to 3; and $n_2$ represents 0 or 1;

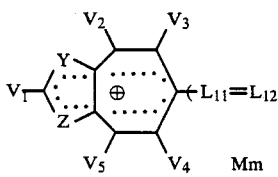

General formula (IV)

wherein $V_1$ to $V_5$, Y, Z, M and m have the same meanings as those in the general formula (I); Y' and Z' have the same meanings with Y an Z, respectively; position of the methine bond may be any of the 4-, 5-, 6-, 7- and 8-positions; $V_1'$ to $V_5'$ have the same meanings with $V_1$ to $V_5$, respectively; $L_{11}$, $L_{12}$ and $L_{13}$ have the same meanings with $L_1$, $L_2$, $L_3$, $L_4$ and $L_5$; and $l_3$ represents an integer of 0 to 3;

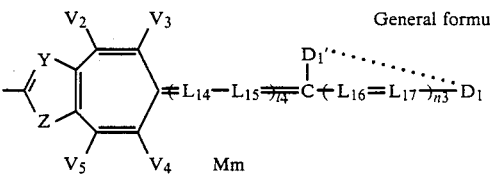

General formula (V)

wherein $V_1$ to $V_5$, Y, Z, M and m have the same meanings as those in the general formula (I); position of the methine bond may be any of the 4-, 5-, 6-, 7- and 8-positions, as is in the general formula (I);

$D_1$ and $D_1'$ each represent atomic groups necessary for forming an acidic nucleus, and may be non-cyclic or cyclic;

$L_{14}$, $L_{15}$, $L_{16}$ and $L_{17}$ have the same meanings with $L_1$, $L_2$, $L_3$, $L_4$ and $L_5$; $l_4$ represents an integer of 0 to 3; and $n_3$ represents 0 or 1;

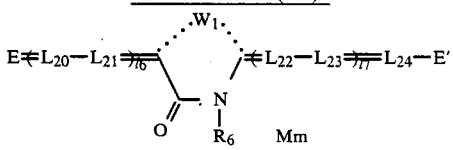

General formula (VI)

wherein $V_1$ to $V_5$, Y, Z, M and m have the same meanings as those in the general formula (I); position of the methine bond may be any of the 4-, 5-, 6-, 7- and 8-positions, as is in the general formula (I);

$R_4$ and $R_5$ represent substituents known in general tertiary amines, and $R_4$ and $R_5$ may combine to form a ring;

$L_{18}$ and $L_{19}$ have the same meanings with $L_1$, $L_2$, $L_3$, $L_4$ and $L_5$; and l represents an integer of 0 to 3;

General formula (VII)

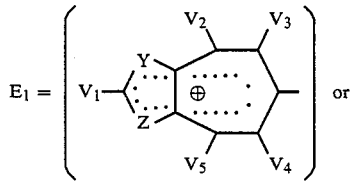

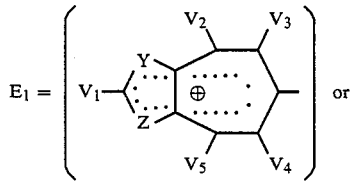

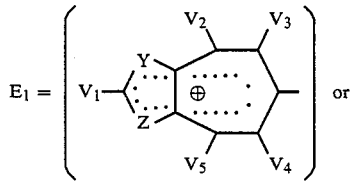

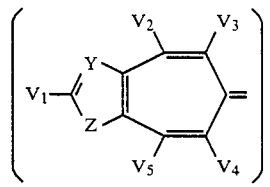

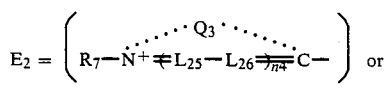

or

General formula (VII)

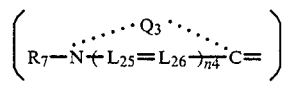

wherein

E and E' each is $E_1$ or $E_2$, provided that at least one of E and E' is $E_1$;

$V_1$ to $V_5$, Y, Z, M and m have the same meanings as those in the general formula (I); positions of the methine bond in $E_1$ may be any of the 4-, 5-, 6-, 7- and 8-positions, as is in the general formula (2);

$W_1$ represents an atomic group necessary for forming a 5- or 6-membered heterocyclic ring;

$R_6$ represents a hydrogen atom, a substituted or unsubstituted alkyl group, a substituted or unsubstituted aryl group or a heterocyclic group;

$Q_3$ and $R_7$ have the same meanings with $Q_1$ and $R_2$ in the general formula (II), respectively;

$L_{20}$, $L_{21}$, $L_{22}$, $L_{23}$, $L_{24}$, $L_{25}$ and $L_{26}$ have the same meanings with $L_1$, $L_2$, $L_{13}$, $L_{14}$ and $L_5$;

$l_6$ and $l_7$ are integers of 0 to 3; and $n_4$ is 0 or 1;

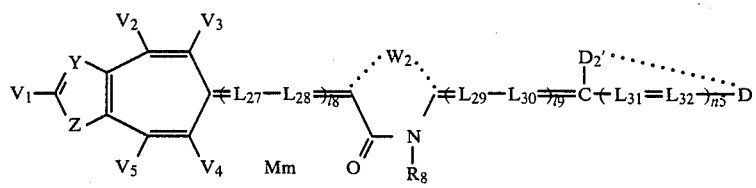

General formula (VIII)

wherein $V_1$ to $V_5$, Y, Z, M and m have the same meanings as those in the general formula (I); position of the methine bond may be any of the 4-, 5-, 6-, 7- and 8-positions, as is in the general formula (I):

$W_2$ has the same meaning with $W_1$; $R_8$ has the same meaning with $R_6$;

$D_2$ and $D_2'$ have the same meanings with $D_1$ and $D_1'$ in the general formula (V), respectively;

$L_{27}$, $L_{28}$, $L_{29}$, $L_{30}$, $L_{31}$ and $L_{32}$ have the same meanings with $L_1$, $L_2$, $L_3$, $L_4$ and $L_5$;

$l_8$ and $l_9$ are integers of 0 to 3; and $n_5$ represents 0 or 1;

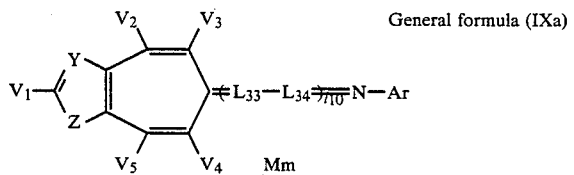

General formula (IXa)

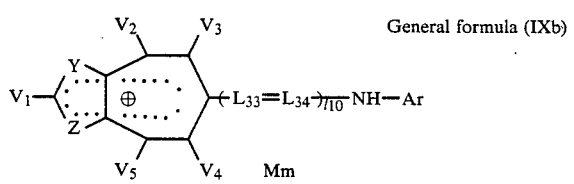

General formula (IXb)

wherein $V_1$ to $V_5$, Y, Z, M and m have the same meanings as those in the general formula (I); position of the methine bond may be any of the 4-, 5-, 6- and 8-positions, as is in the general formula (I);

$L_{33}$ and $L_{34}$ have the same meanings with $L_1$, $L_2$, $L_3$, $L_4$ and $L_5$;

Ar represents an aromatic group; and $l_{10}$ represents an integer of 0 to 3.

7. The optical information recording medium of claim 6, wherein $V_1$, $V_2$, $V_3$, $V_4$, $V_5$, $V_1'$, $V_2'$, $V_3'$, $V_4'$ and $V_5'$ independently represents hydrogen atoms, halogen atoms selected from the group consisting of chlorine atoms, fluorine atoms, and bromine atoms, unsubstituted alkyl groups having 10 or less carbon atoms, substituted alkyl groups having 18 or less carbon atoms, acyl groups having 10 or less carbon atoms, acyloxy groups having 10 or less carbon atoms, substituted or unsubstituted alkoxycarbonyl groups, substituted or unsubstituted carbamoyl groups, substituted or unsubstituted sulfamoyl groups, carboxyl groups, cyano groups, hydroxyl groups, amino groups, acylamino groups having 8 or less carbon atoms, substituted or unsubstituted alkoxy groups having 10 or less carbon atoms, alkylthio groups, alkylsufonyl groups, sulfonic acid groups or aryl groups.

8. The optical information recording medium of claim 6, wherein $Q_1$ or $Q_2$ comprises a thiazole nucleus, a benzothiazole nucleus, a naphthothiazole nucleus, a thiazoline nucleus, an oxazole nucleus, an oxazoline nucleus, a selenazole nucleus, a selenazoline nucleus, a tellurazole nucleus, a tellurazoline nucleus, a 3,3-dialkylindolenine nucleus, an imidazole nucleus, a pyridine nucleus, a quinoline nucleus, an imidazo(4,5-b)-quinoxaline nucleus, an oxadiazole nucleus, a thiadiazole nucleus, a tetrazole nucleus and a pyrimidine nucleus.

9. The optical information recording medium of claim 6, wherein $R_2$, $R_3$ and $R_7$ are selected from the group consisting of an unsubstituted alkyl group having 18 or less carbon atoms and a substituted alkyl group.

10. The optical information recording medium of claim 6, wherein $D_1$ and $D_1'$ or $D_2$ and $D_2'$ combine to form a nucleus comprising 1,3-dialkylbarbituric acid, 1,3-dialkyl-2-thiobarbituric acid or 3-alkylrhodanine.

11. The optical information recording medium of claim 6, wherein $R_4$ and $R_5$, which may be the same or different, comprise unsubstituted alkyl groups each having 18 or less carbon atoms, substituted alkyl groups, cyano groups, alkoxy groups, aryloxy groups, alkoxycarbonyl groups, or $R_4$ and $R_5$ may combine together to form a heterocyclic ring with the proviso that the heterocyclic ring is not an aromatic heterocyclic ring.

12. The optical information recording medium of claim 1, which comprises a recording layer as the dye layer and a subbing layer provided on the support, a protective layer provided on the recording layer, and/or a reflecting layer provided on the support or on the recording layer.

13. The optical information recording medium of claim 1, wherein a single oxygen quencher is further carried thereon.

14. The optical information recording medium of claim 13, wherein the quencher is contained in the recording layer.

15. The optical information recording medium of claim 13, wherein the quencher is used in an amount of 0.05 to 12 moles per 1 mole of the methine dye(s).

16. The optical information recording medium of claim 1, wherein the film thickness of the recording layer is 0.01 to 2 μm.

17. The optical information recording medium of claim 1, wherein the chalcogen atom is selected from the group consisting of oxygen, sulfur, selenium and tellurium atoms.

18. The optical information recording medium of claim 1, further comprising a quencher represented by formulae (XXI) and (XXII):

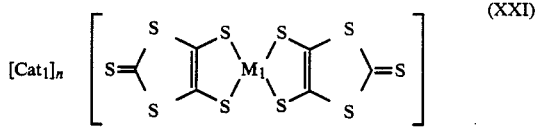 (XXI)

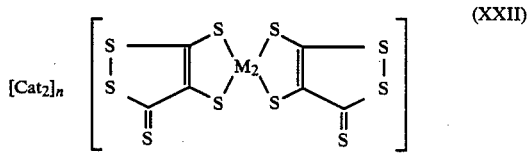 (XXII)

wherein (Cat$_1$) and (Cat$_2$) each represent a cation necessary for making each compound neutral, M$_1$ and M$_2$ each represent nickel, copper, cobalt, palladium or platinum, and n represents 1 or 2.

19. The optical information recording medium of claim 18, wherein the cations (Cat$_1$) and (Cat$_2$) are represented by formulae (XXIII-a), (XXIII-b), (XXIII-c), (XXIII-d) or (XXIII-e):

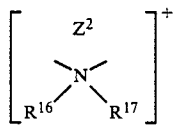 (XXIII-a)

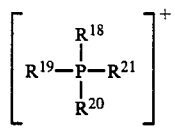 (XXIII-b)

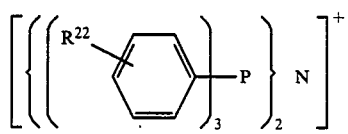 (XXIII-c)

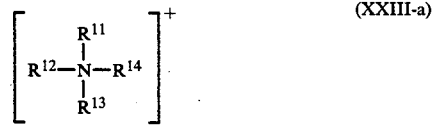 (XXIII-d)

 (XXIII-e)

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ each represent a substituted or unsubstituted alkyl group having 1 to 20 carbon atoms, or a substituted or unsubstituted aryl group having 6 to 14 carbon atoms, and $Z^1$ and $Z^2$ each represent a nonmetal atomic group which forms a 5-membered or a 6-membered ring together with a nitrogen atom or a phosphorus atom in each formula.

20. The optical information recording medium of claim 18, wherein the quencher of formula (XXI) is selected from the group consisting of (XXI-1), (XXI-2), (XXI-3) and (XXI-4):

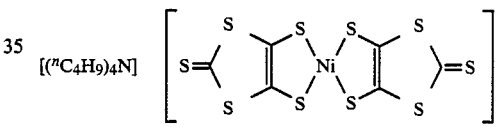 XXI-(1)

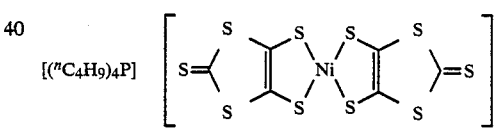 XXI-(2)

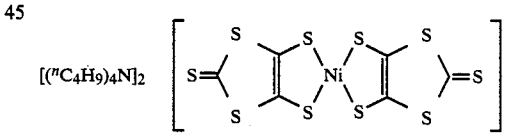 XXI-(3)

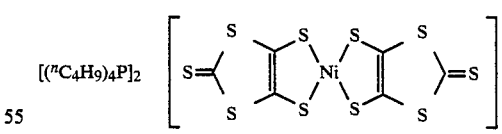 XXI-(4)

* * * * *